United States Patent
Giri et al.

(10) Patent No.: US 12,542,439 B2
(45) Date of Patent: Feb. 3, 2026

(54) SWITCHED RECONFIGURABLE MULTI-CONVERTER MULTI-SOURCE ENERGY STORAGE SYSTEM CONFIGURATION FOR ELECTRIFIED VEHICLES AND POWER FLOW CONTROL SCHEME THEREOF

(71) Applicant: COUNCIL OF SCIENTIFIC AND INDUSTRIAL RESEARCH, New Delhi (IN)

(72) Inventors: Santu Kumar Giri, West Bengal (IN); Pratim Bhattacharyya, West Bengal (IN); Siddheswar Sen, West Bengal (IN); Naresh Chandra Murmu, West Bengal (IN); Sourav Sadhukhan, West Bengal (IN)

(73) Assignee: COUNCIL OF SCIENTIFIC AND INDUSTRIAL RESEARCH, New Delhi (IN)

( * ) Notice: Subject to any disclaimer, the term of this patent is extended or adjusted under 35 U.S.C. 154(b) by 252 days.

(21) Appl. No.: 18/465,535

(22) Filed: Sep. 12, 2023

(65) Prior Publication Data
US 2024/0088665 A1   Mar. 14, 2024

(51) Int. Cl.
*H02J 3/32* (2006.01)
*B60L 50/60* (2019.01)
(Continued)

(52) U.S. Cl.
CPC .............. *H02J 3/322* (2020.01); *B60L 50/60* (2019.02); *B60L 55/00* (2019.02); *H02J 3/001* (2020.01);
(Continued)

(58) Field of Classification Search
CPC .......... B60L 53/55; B60L 50/60; B60L 53/53; B60L 3/04; B60L 55/00; B60L 3/0092;
(Continued)

(56) References Cited

U.S. PATENT DOCUMENTS 7,859,202 B2   12/2010   Lukic et al.
8,633,670 B2   1/2014    Choi
(Continued)

FOREIGN PATENT DOCUMENTS

CN     109910641 A    6/2019

*Primary Examiner* — Antony M Paul
(74) *Attorney, Agent, or Firm* — CANTOR COLBURN LLP

(57) ABSTRACT

The present disclosure provides a switched reconfigurable multi-converter multi-source energy storage system configuration for electrified vehicles comprising of multiple dc/dc power converters, multiple energy sources, a mode selector switching module further comprising a plurality of controllable switches and a controller. A method of switching to reconfigure the multi-converter multi-source energy storage system during the dynamic events of variable power demand or regeneration in an electrified vehicle is disclosed. Furthermore, a power flow control scheme for executing the dynamic switching methods of reconfiguration to maneuver the flow of power within the system during different scenarios of forward power delivery or reverse power accumulation is disclosed. The controllable switches are methodically activated or deactivated to couple or decouple the energy sources to or from the input side of the dc/dc power converters by means of necessary activation or deactivation signals from the controller. Nevertheless, a fault tolerant control scheme is disclosed to ensure fail-safe operation of the switched reconfigurable system during the occurrence of fault in any of the dc/dc power converters.

15 Claims, 16 Drawing Sheets

(51) Int. Cl.
*B60L 55/00* (2019.01)
*H02J 3/00* (2006.01)
*H02J 3/38* (2006.01)
*H02M 3/335* (2006.01)

(52) U.S. Cl.
CPC ........... *H02J 3/38* (2013.01); *H02M 3/33584* (2013.01); *B60L 2210/10* (2013.01)

(58) Field of Classification Search
CPC ........................... B60L 2210/10; B60L 50/51; H02M 3/33584; H02M 1/32; H02M 1/0048; H02M 3/1584; H02M 1/0058; H02M 3/1582; H02J 3/38; H02J 3/001; H02P 27/06; H02P 2101/45; H02P 2201/07; H02P 2201/09; H02P 2201/11; Y02T 90/14; Y02T 10/70
See application file for complete search history.

(56) References Cited

U.S. PATENT DOCUMENTS

| | | | |
|---|---|---|---|
| 9,878,635 B1* | 1/2018 | Khaligh | B60L 58/20 |
| 9,899,843 B2 | 2/2018 | Li | |
| 10,056,755 B2 | 8/2018 | Li et al. | |
| 10,293,702 B2 | 5/2019 | Tu et al. | |
| 10,369,896 B2 | 8/2019 | Namuduri et al. | |

\* cited by examiner

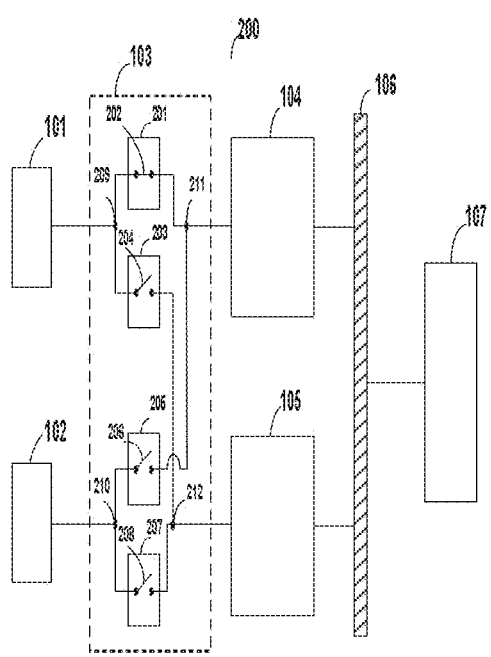 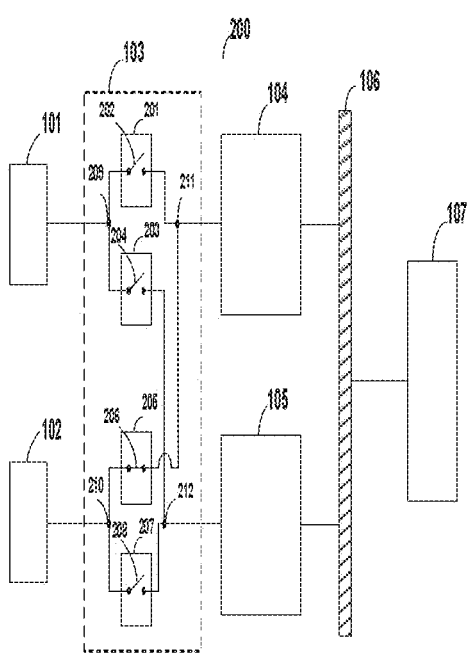
Figure 3aFigure 3b

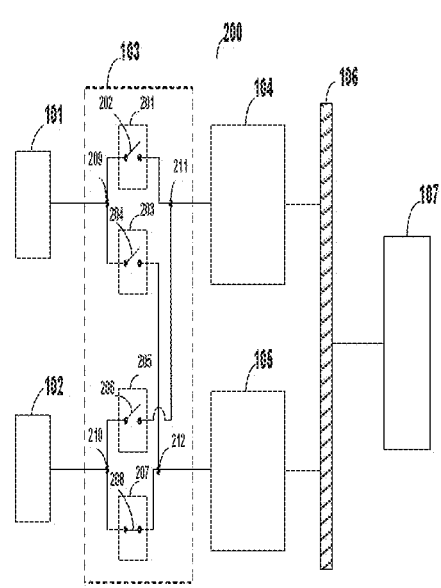 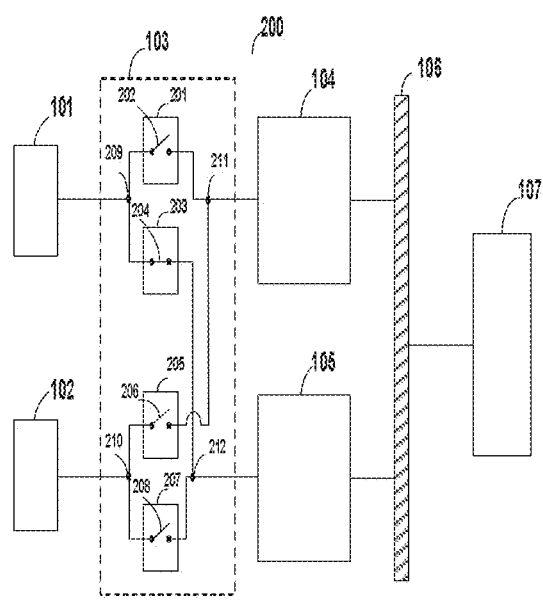
Figure 4a                    Figure 4b

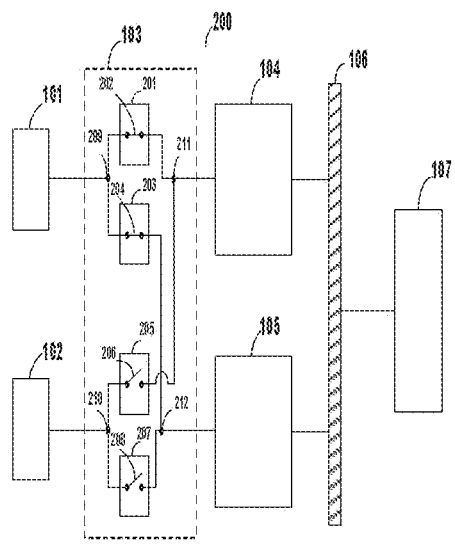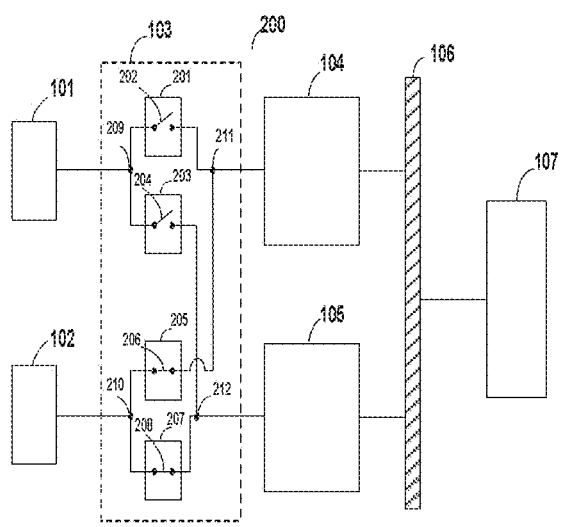
Figure 5a
Figure 5b
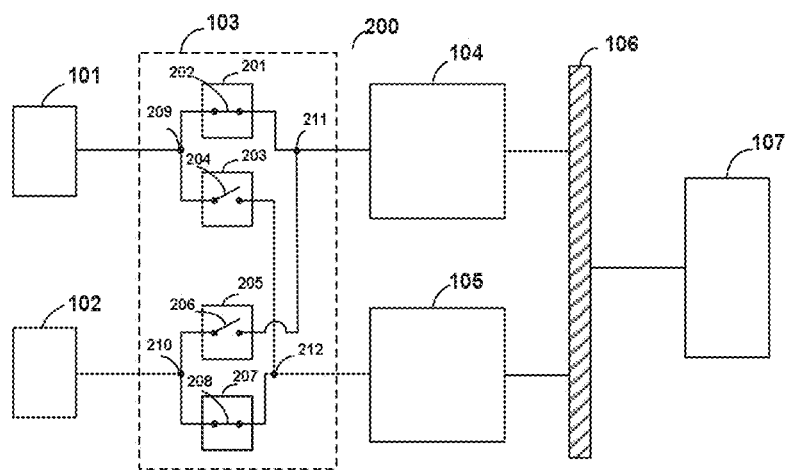
Figure 5c

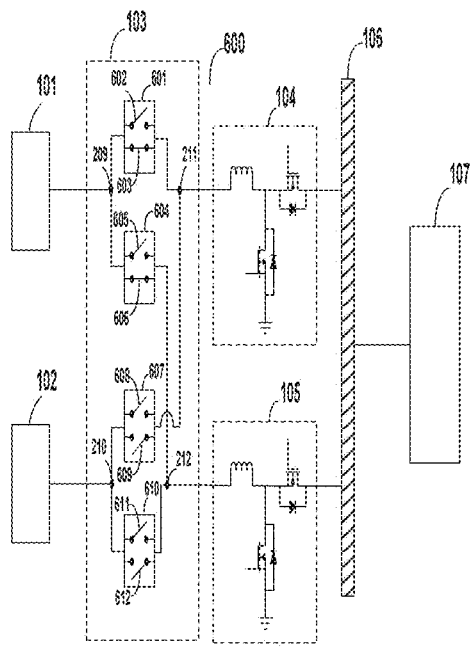
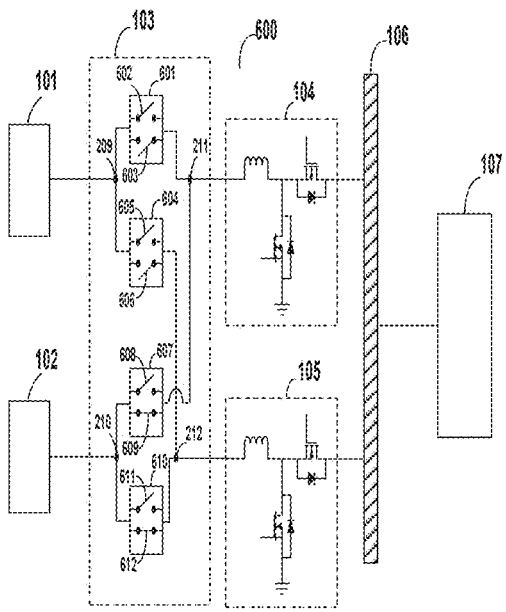
Figure 9a          Figure 9b
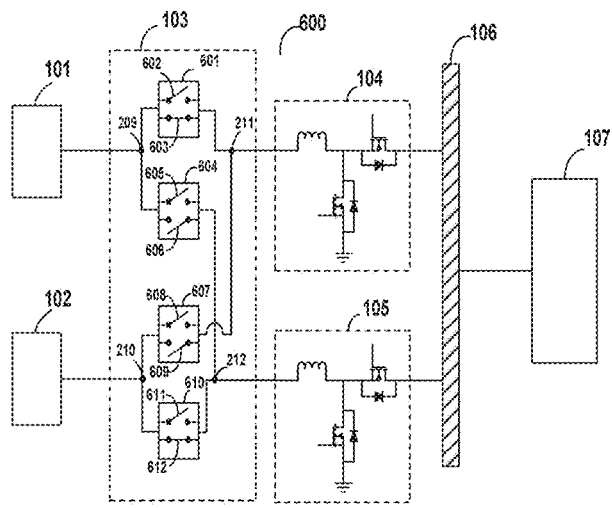
Figure 9c

SWITCHED RECONFIGURABLE MULTI-CONVERTER MULTI-SOURCE ENERGY STORAGE SYSTEM CONFIGURATION FOR ELECTRIFIED VEHICLES AND POWER FLOW CONTROL SCHEME THEREOF

CROSS-REFERENCE TO RELATED APPLICATIONS

This application claims the benefit of Indian Application No. 202211052409 filed Sep. 13, 2022, the disclosure of which is incorporated herein by reference in its entirety.

FIELD OF INVENTION

The present invention relates to a switched reconfigurable multi-converter multi-source energy storage system configuration for electrified vehicles and power flow control scheme thereof. More precisely, the present disclosure relates to the different methods of switching executed for reconfiguring multiple dc/dc power converters to couple with the energy sources depending upon the dynamic load power scenarios encountered in electrified vehicles during the modes of normal speed operation, acceleration or regenerative braking, thereby ensuring improved utilization of the energy sources and the dc/dc power converters with enhanced flexibility.

BACKGROUND

Reference may be made to the U.S. Ser. No. 10/293,702B2 wherein the invention is related to a reconfigurable hybrid energy storage system for electrified vehicles. The system comprises of a first energy storage system, a second energy storage system and a single power converter coupled to the first energy storage system and second energy storage system. The different reconfiguration methods involve the first energy storage system to be configured in series or parallel with the second energy storage system depending upon the load voltage or current requirements. One of the main drawbacks of the patented invention is that the reconfiguration methods are only limited within multiple energy storage systems being configured in series or parallel configuration without the intervention of multiple dc/dc power converters. Therefore, the system lacks good control over the energy storage systems and the subsequent power transfer owing to the presence of only a single dc/dc power converter. This also restrains the flexibility and modularity of the overall system. The other drawback of the patented invention is that a dc/dc power converter having wide operational range of voltage and power needs to be selected based on the fact that the system involves reconfiguration methods where the energy storage systems are configured in series to achieve a higher voltage at the output or configured in parallel for achieving a higher current. Thus, the maximum utilization of the dc/dc power converter is restricted. Furthermore, the patented invention does not disclose the method for reconfiguration of the system under the scenarios of fault occurrence in the dc/dc power converter.

Reference may be made to the U.S. Pat. No. 9,899,843B2 wherein the invention relates to a multi-source energy storage system comprising of multiple energy storage systems (ESSs), multiple DC/DC converters, multiple switching devices positioned between the energy storage systems and corresponding dc/dc power converters, and a bypass switch. The system as described in the patented invention can operate only in normal mode or fault protection mode. One of the main drawbacks of the system described in the patented invention is that, it provides only a single variant of configuration during normal mode of operation i.e., by coupling the first ESS to the first dc/dc power converter and second ESS to the second dc/dc power converter and hence lacks the provision for multiple distinct reconfigurations depending upon the mode of operation during the dynamic events of steady speed operation, acceleration or regenerative braking in an electrified vehicle. More specifically, the system does not allow the flexibility for reconfiguration to couple either of the ESS to both the dc/dc power converters configured in parallel. Furthermore, in fault protection mode described in the patented invention, the first ESS is coupled to the electric load through the by-pass switch and the second ESS is decoupled from the electric load, thereby eliminating the possibility for engagement of both the dc/dc power converters during the operation even if any of the dc/dc power converters is non-faulty.

Reference may be made to the U.S. Pat. No. 7,859,202B2 wherein the invention is related to power management for a multi module energy storage system in electrified vehicles. In the patented invention, a controller is incorporated with the dc/dc power converters for controlling the power transfer to or from the energy storage system by continually monitoring the load demand and the state of charge (SOC) of the energy storage systems. However, the system does not employ any method for altering the configuration depending upon the dynamic load power scenarios since it is devoid of any switching arrangement for reconfiguration. The major drawback of the system is that it does not address the scenarios related to fault occurrence in any of the dc/dc power converters during which the associated energy storage system becomes non-functional.

Reference may be made to the U.S. Ser. No. 10/056,755B2 wherein the invention relates to a multi-source energy storage system comprising of first ESS, second ESS, first dc/dc power converter, second dc/dc power converter and a bypass coupled to the first ESS and load. Apart from that, a first switch device is coupled between the first ESS and first dc/dc power converter and a second switch device is coupled between the second ESS and second dc/dc power converter. The system described in the patented invention operates in normal mode, pre-charge mode and fail-safe mode. The main drawback of the system is lack of flexibility owing to restrictions in achieving multiple variants of configuration depending upon the nature of power flow, load power level and state of charge of the ESS during the dynamic events of steady speed operation, acceleration and regenerative braking in an electrified vehicle. Furthermore, the fault protection mode of the system involves the first ESS being coupled to the electric load through the by-pass and the second ESS being decoupled from the electric load thereby eliminating the possibility for engagement of both the dc/dc power converters during the operation even if any of the dc/dc power converters is functioning properly. Additionally, the patented invention does not disclose any control scheme for implementation of the switching methods for reconfiguration.

Reference may be made to the U.S. Pat. No. 8,633,670B2 wherein the invention relates to a reconfigurable energy storage system for charging/discharging power of a plurality of battery packs connected between grid and a variable power source. The system also comprises of a plurality of converters connected between the battery pack, the variable power source and the grid, a plurality of battery switching devices being respectively connected between the converters and the battery packs, and a plurality of converter switching devices to individually connect corresponding ends of the battery switching devices to one another. The main drawback of the system is that the switching arrangement does not allow achieving reconfiguration of the system to a variant where multiple converters are connected to a single battery pack. Moreover, the applicability of the reconfigurable energy storage system is restricted only to the electric grid storage having battery pack as the energy storage system. Another drawback of the system that can be highlighted is that the switching arrangement does not allow reconfiguration the system during the occurrence of fault in any of the converters. Apart from that, the patented invention also does not disclose any control scheme for implementation of the switching methods for reconfiguration.

Reference may be made to the Patent no CN109910641A wherein, the invention discloses a high efficiency composite energy storage system for a pure electric vehicle comprising of a super capacitor bank, a bidirectional dc/dc converter, a storage battery pack, a power diode, a power switch tube and a composite energy storage system controller. The system configuration of the patented invention has the super capacitor connected directly to the dc-link in parallel while the storage battery is interfaced to the dc-link through a bidirectional dc/dc converter. One of the drawbacks of the patented invention is that the invention is specified for an application involving only a battery, a super capacitor and a single bidirectional dc/dc converter which restricts its control over the power transfer from the supercapacitor due to absence of a secondary dc/dc power converter. Another drawback of the patented invention is that the system lacks the flexibility of dynamic reconfiguration in multiple distinct configurations during various load power scenarios.

Reference may be made to the U.S. Ser. No. 10/369, 896B2 wherein, an apparatus for DC fast charging of an electrified vehicle is provided which comprises of a charge receptacle, a vehicle charging controller, a reconfigurable energy storage system further comprising of two rechargeable energy storage devices and a plurality of low loss switching devices. The '896 apparatus is intended for fast charging application of an electrified vehicle. Although the reconfigurable system allows series or parallel configuration of the rechargeable energy storage devices by actuating the low loss switching devices, it deficits in achieving proper control over the rechargeable energy storage devices owing to the absence of dc/dc power converters which is a major drawback of the system. Additionally, the fault mode scenario in the patented invention is addressed by configuring the system through bypassing the faulty energy storage device.

From the above prior art details, it is observed that the systems described exhibit certain drawbacks and dissimilarities from the present invention in many aspects of configuration and operational features. Energy storage system for an electrified vehicle plays a very crucial role in the performance of the vehicle during various driving scenarios like acceleration, regenerative braking, steady speed operation etc. Hence, it needs to be designed appropriately in order to achieve optimal performance. But, an energy storage system based on merely a single energy source is insufficient to meet the dynamic power requirements of an electrified vehicle. In view of this, incorporation of multiple energy sources proves to be an effective solution to satisfy the dynamic power requirements, without having to excessively increase the size of the single energy source. However, when multiple energy sources are introduced into the vehicle's powertrain, the configuration and control between the multiple energy sources becomes challenging. Therefore, the problem of appropriate configuration and control of the multiple energy sources to ensure efficient operation of the vehicle's powertrain and to enhance the performance of the vehicle while dealing with variety of dynamic driving conditions needs to be resolved within the industry. Accordingly, the present disclosure aims to resolve the aforementioned problems while duly addressing the drawbacks of the cited prior arts by providing a switched reconfigurable multi-converter multi-source energy storage system configuration.

SUMMARY

In carrying out principles of the present invention in accordance with a preferred embodiment thereof, one aspect of the present invention is to provide a switched reconfigurable multi-converter multi-source energy storage system configuration comprising of a first energy source, a second energy source, a first dc/dc power converter, a second dc/dc power converter, a mode selector switching module consisting of plurality of controllable switches positioned in between the energy sources and the dc/dc power converters and a controller for implementing the control scheme for the operation of the system. The term energy source signifies an electrical energy source capable of storing, delivering or accumulating electrical energy. In this invention, battery, ultracapacitor (or super capacitor), fuel cell etc. are considered as an energy source for electrified vehicles. Each of the energy source can be coupled to or decoupled from the inputs of one or more dc/dc power converters on activation or deactivation of the controllable switches of the mode selector switching module. Here the term 'couple' signifies forming an electrical connection i.e a connection that allows the passage of current there through. Likewise, 'decouple' signifies being electrically disconnected i.e disruption of the passage of current there through. The outputs of the dc/dc power converters are directly coupled to a load corresponding to electric motor drive train of an electrified vehicle through a common dc-link. Although the system of the present invention is described with a preferred embodiment comprising of two energy sources and two do/dc power converters, it is also applicable for a system comprising of more than two energy sources and/or more than two dc/dc power converters without the loss of generality. Accordingly, the number of controllable switches is equal to the product of number of energy sources and number of dc/dc power converters.

Unless otherwise defined, the technical or scientific terms used in this specification will retain the ordinary meaning as understood by a layperson in the technical field of the present invention. "First", "second" and other similar words used in the present specification and claim do not specify any particular order, quantity or importance, but are simply used for distinguishing different components.

The novelty of the present invention is the switched reconfigurable energy storage system employing multiple do/dc power converters, multiple energy sources, a mode selector switching module and a controller for improved dynamic performance of electrified vehicles.

The non-obvious inventive steps of the present invention include:
i) The various methods of switching of the switched reconfigurable system for achieving diverse dynamic reconfigurations to allocate and configure the multiple energy sources with the multiple dc/dc converters depending upon the dynamic load power scenarios corresponding to steady speed operation, acceleration and regenerative braking of the electrified vehicle.

ii) The power flow control scheme devised for dynamic execution of the different switching methods of reconfiguration based on the nature of load power, the load power level, power ratings of the dc/dc converters and the state of charge (SOC)s of the energy sources to effectively maneuver the flow of power within the system during the events of forward power delivery and reverse power accumulation.

iii) The fault tolerant control scheme to ensure fail-safe operation of the switched reconfigurable system during the occurrence of fault in any of the dc/dc converters.

The aforementioned control schemes in conjunction with the different switching methods for reconfiguration aim to augment the dynamic performance of the system.

An important object of the disclosure is to provide a Switched Reconfigurable Multi-Converter Multi-Source Energy Storage System for Electrified Vehicles and Power Flow Control Scheme Thereof, which obviates the drawbacks of the hitherto known prior art as detailed above. Some of the objects of the present disclosure aimed to ameliorate one or more problems of the prior art or to at least provide a useful alternative are listed herein.

Another object of the present invention is to provide a switching arrangement for the reconfigurable multi-converter multi-source energy storage system.

Still another object of the present invention is to provide an Energy Storage System Configuration for dynamic reconfiguration of the multi-converter multi-source energy storage system.

Yet another object of the present invention is to provide an Energy Storage System Configuration for reconfiguration of the system during the event of forward power delivery to improve the utilization efficiency of the energy sources and the dc/dc power converters. Here the term 'forward power delivery' corresponds to the forward flow of power from the energy source side to the load side when the load power is demanded during the dynamic events of steady speed operation or acceleration of an electrified vehicle.

Still another object of the present invention is to provide an Energy Storage System Configuration for reconfiguration of the system during the event of reverse power accumulation for enhanced recuperation of the regenerative power in the energy sources. Here the term 'reverse power accumulation' corresponds to the reverse flow of regenerated power from the load side to the energy source side during the dynamic events of regenerative braking of an electrified vehicle.

Yet another object of the present invention is to provide an Energy Storage System Configuration for reconfiguration of the system during the dynamic events of forward power delivery or reverse power accumulation when the dc/dc power converters are of unequal power ratings.

Still another object of the present invention is to provide an Energy Storage System Configuration to reconfigure the system when any of the dc/dc power converters encounters a fault.

Yet another object of the present invention is to provide a power flow control scheme for activating or deactivating the controllable switches during dynamic events of forward power delivery or reverse power accumulation.

Still another object of the present invention is to provide a fault tolerant control scheme for activating or deactivating the controllable switches when any of the dc/dc power converters encounters a fault.

Other features and advantages of the invention will be apparent from the following description provided in the present disclosure.

BRIEF DESCRIPTION OF DRAWINGS

FIG. 3a illustrates a representation of the block level schematic of switched reconfigurable multi-converter multi-source energy storage system (200) during the event of forward power delivery mode 1 when only the first controllable switch $S_{11}$ (201) is activated, according to an embodiment of the present disclosure.

FIG. 3b illustrates a representation of the block level schematic of switched reconfigurable multi-converter multi-source energy storage system (200) during the event of forward power delivery mode 1 when only the third controllable switch $S_{21}$ (205) is activated, according to an embodiment of the present disclosure.

FIG. 4a illustrates a representation of the block level schematic of switched reconfigurable multi-converter multi-source energy storage system (200) during the event of forward power delivery mode 2 when only the fourth controllable switch $S_{22}$ (207) is activated, according to an embodiment of the present disclosure.

FIG. 4b illustrates a representation of the block level schematic of switched reconfigurable multi-converter multi-source energy storage system (200) during the event of forward power delivery mode 2 when only the second controllable switch $S_{12}$ (203) is activated, according to an embodiment of the present disclosure.

FIG. 5a illustrates a representation of the block level schematic of switched reconfigurable multi-converter multi-source energy storage system (200) during the event of forward power delivery mode 3 when both the first controllable switch Su (201) and the second controllable switch $S_{12}$ (203) are activated, according to an embodiment of the present disclosure.

FIG. 5b illustrates a representation of the block level schematic of switched reconfigurable multi-converter multi-source energy storage system (200) during the event of forward power delivery mode 3 when both the third controllable switch $S_{21}$ (205) and the fourth controllable switch $S_{22}$ (207) are activated, according to an embodiment of the present disclosure.

FIG. 5c illustrates a representation of the block level schematic of switched reconfigurable multi-converter multi-source energy storage system (200) during the event of forward power delivery mode 3 when both of the first controllable switch Su (201) and the fourth controllable switch $S_{22}$ (207) are activated, according to an embodiment of the present disclosure.

FIG. 9a illustrates a representation of the block level schematic of switched reconfigurable multi-converter multi-source energy storage system (200) during the event of reverse power accumulation mode 3 when both the first controllable switch $S_{11}$ (601) and the second controllable switch $S_{12}$ (604) are activated, according to an embodiment of the present disclosure.

FIG. 9b illustrates a representation of the block level schematic of switched reconfigurable multi-converter multi-source energy storage system (200) during the event of reverse power accumulation mode 3 when both the third controllable switch $S_{21}$ (607) and the fourth controllable switch $S_{22}$ (610) are activated, according to an embodiment of the present disclosure.

FIG. 9c illustrates a representation of the block level schematic of switched reconfigurable multi-converter multi-source energy storage system (200) during the event of reverse power accumulation mode 3 when both of the first controllable switch $S_{11}$ (601) and the fourth controllable switch $S_{22}$ (610) are activated, according to an embodiment of the present disclosure.

DETAILED DESCRIPTION

Figure 1:
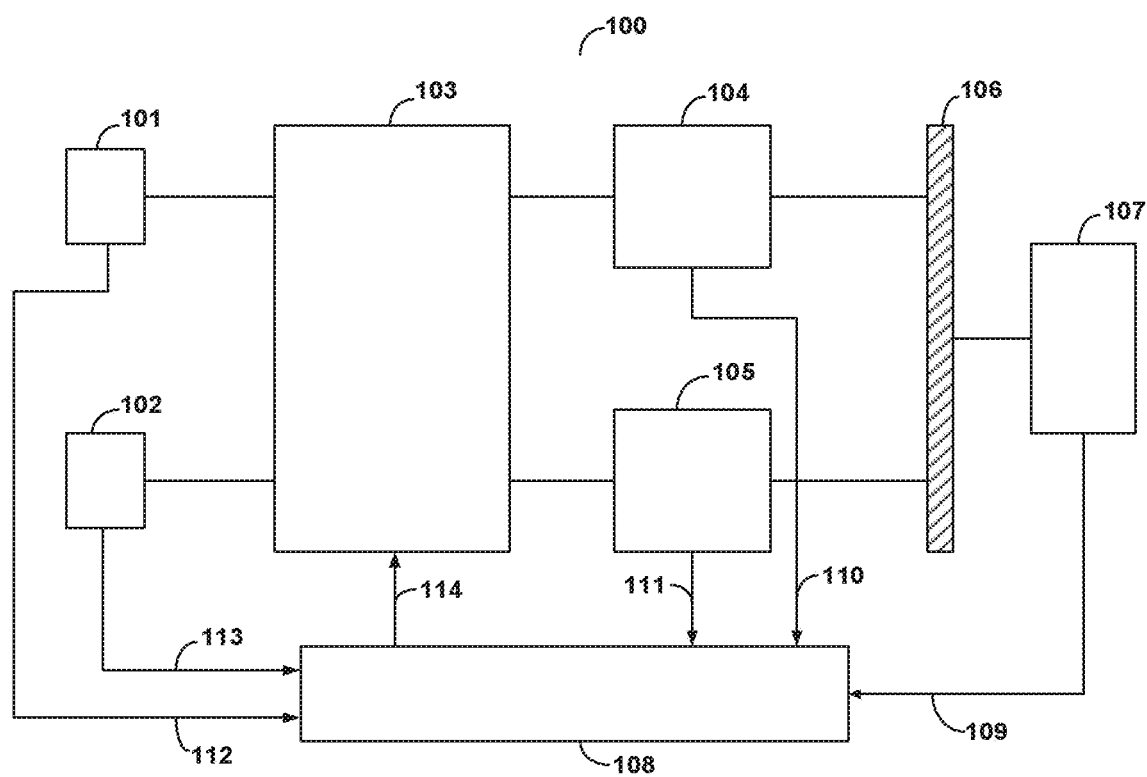
FIG. 1 represents the block level schematic of the overall configuration of the switched reconfigurable multi-converter multi-source energy storage system, according to an embodiment of the present disclosure.

The system of the present invention incorporates multiple dc/dc power converters to achieve superior control over the multiple energy sources. The system also provides various switching methods for achieving multiple dynamic reconfigurations to allocate and configure the multiple energy sources with the multiple dc/dc power converters depending upon the dynamic load power scenarios corresponding to steady speed operation, acceleration and regenerative braking of the electrified vehicle. This ensures improved utilization of the energy sources and the dc/dc power converters thereby enhancing the power delivering and regenerative power recuperation capability of the system. Apart from that, the system also implements a power flow control scheme for execution of the switching methods of reconfiguration to maneuver the flow of power within the system during dynamic modes of operation. Furthermore, a fault tolerant control scheme is also implemented to reconfigure the system during the occurrence of fault in any of the dc/dc power converters. The system of the present invention is equally adaptable regardless of the power ratings and type of the energy sources and dc/dc power converters.

The present invention is illustrated in FIGS. 1 to 13 of the drawing(s) accompanying this specification. In the drawings like reference numbers/letters indicate corresponding parts in the various figures. The abbreviations of various parameters used to describe the figures are listed in Table 1.

TABLE 1

| Parameters | Description |
|---|---|
| $P_D$ | Power demand from the load/electric drivetrain |
| $P_{C1}$ | Power rating of the first dc/dc power converter |
| $P_{C2}$ | Power rating of the second dc/dc power converter |
| $P_{C1} + P_{C2}$ | Combined power rating of both the first dc/dc power converter and the second dc/dc power converter |
| $SOC_{ES1}$ | State of Charge of the first energy source |
| $SOC_{ES2}$ | State of Charge of the second energy source |
| $SOC_{LF}$ | Threshold level of the State of Charge of the energy source during forward power delivery modes |
| $SOC_{LR}$ | Threshold level of the State of Charge of the energy source during reverse power accumulation modes |
| $S_{11}$ | The controllable switch which couples the first energy source with the first dc/dc converter |
| $S_{12}$ | The controllable switch which couples the first energy source with the second dc/dc converter |
| $S_{21}$ | The controllable switch which couples the second energy source with the first dc/dc converter |
| $S_{22}$ | The controllable switch which couples the second energy source with the second dc/dc converter |
| MOSFET | Metal Oxide Semiconductor Field Effect Transistor |

FIG. 1 represents the block level schematic of the overall configuration of the switched reconfigurable multi-converter multi-source energy storage system (100) comprising of first energy source (101), second energy source (102), a mode selector switching module (103), first dc/dc power converter (104), second dc/dc power converter (105), a common dc-link (106), a load (107) corresponding to electric motor drive train of an electrified vehicle and a controller (108) for providing the control signals to the mode selector switching module (103). The mode selector switching module (103) is positioned in between the energy sources and the dc/dc power converters with the first energy source (101) and the second energy source (102) being connected to one end regarded as the input end of the mode selector switching module (103) while the another end regarded as the output end of the mode selector switching module (103) being connected to the one ends or the input ends of the first dc/dc power converter (104) and the second dc/dc power converter (105) respectively. The other ends regarded as the output ends of both the first dc/dc power converter (104) and the second dc/dc power converter (105) are respectively connected to a common dc-link (106) which is further connected to a load (107). The controller (108) receives the respective status signals from different components of the system which are represented by arrows inward to the controller and sends the control signal to the mode selector switching module (103) represented by the arrow outward from the controller. The status signal of the load (107) is represented by the arrow (109) inward to the controller and on the similar note the respective status signals of the first dc/dc power converter (104) is represented by the arrow (110), the second do/dc power converter (105) is represented by the arrow (111), the first energy source (101) is represented by the arrow (112) and the second energy source (102) is represented by the arrow (113) all of which are inwards to the controller. Conversely, the control signal from the controller (108) responsible for controlling the mode selector switching module (103) is represented by the arrow (114) outward from the controller (108). The mode selector switching module (103) determines the coupling or decoupling of the energy sources to or from the dc/dc power converters depending upon control signals received from the controller (108) during the various modes of events.

Figure 2:
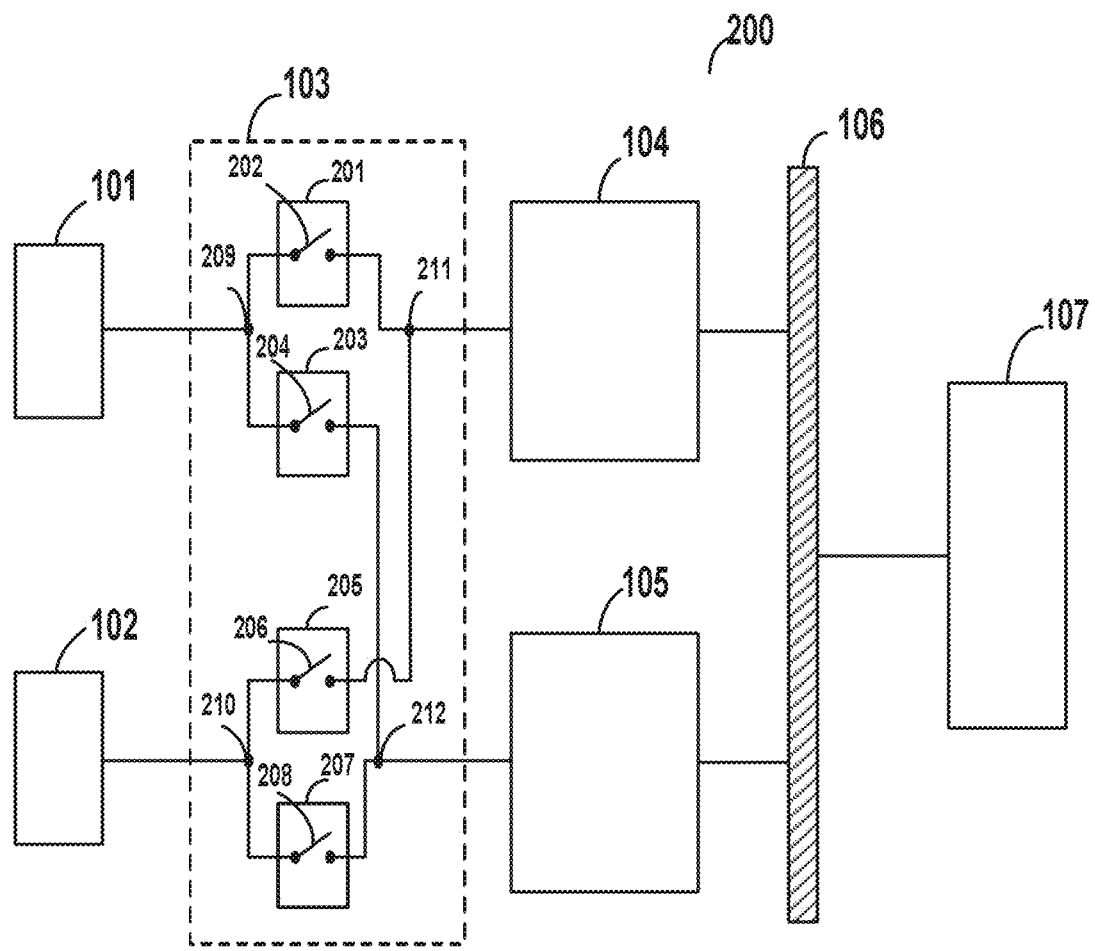
FIG. 2 represents a more detailed representation of the block level schematic of switched reconfigurable multi-converter multi-source energy storage system, according to an embodiment of the present disclosure.

FIG. 2 represents a more detailed representation of the block level schematic of switched reconfigurable multi-converter multi-source energy storage system (200) with additional detailing provided to the mode selector switching module (103), which further comprises of four numbers of controllable switches designated as the first controllable switch $S_{11}$ (201), second controllable switch $S_{12}$ (203), third controllable switch $S_{21}$ (205) and fourth controllable switch $S_{22}$ (207) respectively. The first controllable switch Su (201) is positioned between the first energy source (101) and the input side of the first dc/dc power converter (104) with it's one end being connected to the first energy source (101) through the common node (209) and the other end being connected to the input side of the first dc/dc power converter (104) through the common node (211). The first controllable switch S (201) is either activated resulting in closure of the path (202) for coupling the first energy source (101) to the input side of the first dc/dc power converter (104) or deactivated resulting in opening of the path (202) for decoupling the first energy source (101) from the input side of the first dc/dc power converter (104). The second controllable switch $S_{12}$ (203) is positioned between the first energy source (101) and the input side of the second dc/dc power converter (105) with it's one end being connected to the first energy source (101) through the common node (209) and the other end being connected to the input side of the second dc/dc power converter (105) through the common node (212). The second controllable switch $S_{12}$ (203) is either activated resulting in closure of the path (204) for coupling the first energy source (101) to the input side of the second dc/dc power converter (105) or deactivated resulting in opening of the path (204) for decoupling the first energy source (101) from the input side of the second dc/dc power converter (105). The third controllable switch $S_{21}$ (205) is positioned between the second energy source (102) and the input side of the first dc/dc power converter (104) with it's one end being connected to the second energy source (102) through the common node (210) and the other end being connected to the input side of the first dc/dc power converter (104) through the common node (211). The third controllable switch $S_{21}$ (205) is either activated resulting in closure of the path (206) for coupling the second energy source (102) to the input side of the first dc/dc power converter (104) or deactivated resulting in opening of the path (206) for decoupling the second energy source (102) from the input side of the first dc/dc power converter (104). The fourth controllable switch $S_{22}$ (207) is positioned between the second energy source (102) and the input side of the second dc/dc power converter (105) with it's one end being connected to the second energy source (102) through the common node (210) and the other end being connected to the input side of the second dc/dc power converter (105) through the common node (212). The fourth controllable switch $S_{22}$ (207) is either activated resulting in closure of the path (208) for coupling the second energy source (102) to the input side of the second dc/dc power converter (105) or deactivated resulting in opening of the path (208) for decoupling the second energy source (102) from the input side of the second dc/dc power converter (105).

FIG. 3a illustrates a representation of the block level schematic of switched reconfigurable multi-converter multi-source energy storage system (200) during the event of forward power delivery mode 1 when only the first controllable switch Su (201) is activated resulting in closure of the path (202) to couple the first energy source (101) with the input side of the first dc/dc power converter (104) thereby enabling the first energy source (101) to deliver the required power to the load (107) through the first dc/dc power converter (104). During this mode of operation all of the other remaining controllable switches (203, 205 and 207) are kept deactivated.

FIG. 3b illustrates a representation of the block level schematic of switched reconfigurable multi-converter multi-source energy storage system (200) during the event of forward power delivery mode 1 when only the third controllable switch $S_{21}$ (205) is activated resulting in closure of the path (206) to couple the second energy source (102) with the input side of the first dc/dc power converter (104) thereby enabling the second energy source (102) to deliver the required power to the load (107) through the first dc/dc power converter (104). During this mode of operation all of the other remaining controllable switches (201, 203 and 207) are kept deactivated.

FIG. 4a illustrates a representation of the block level schematic of switched reconfigurable multi-converter multi-source energy storage system (200) during the event of forward power delivery mode 2 when only the fourth controllable switch $S_{22}$ (207) is activated resulting in closure of the path (208) to couple the second energy source (102) with the input side of the second dc/dc power converter (105) thereby enabling the second energy source (102) to deliver the required power to the load (107) through the second dc/dc power converter (105). During this mode of operation all of the other remaining controllable switches (201, 203 and 205) are kept deactivated.

FIG. 4b illustrates a representation of the block level schematic of switched reconfigurable multi-converter multi-source energy storage system (200) during the event of forward power delivery mode 2 when only the second controllable switch $S_{12}$ (203) is activated resulting in closure of the path (204) to couple the first energy source (101) with the input side of the second dc/dc power converter (105) thereby enabling the first energy source (101) to deliver the required power to the load (107) through the second dc/dc power converter (105). During this mode of operation all of the other remaining controllable switches (201, 205 and 207) are kept deactivated.

FIG. 5a illustrates a representation of the block level schematic of switched reconfigurable multi-converter multi-source energy storage system (200) during the event of forward power delivery mode 3 when both the first controllable switch $S_{11}$ (201) and the second controllable switch $S_{12}$ (203) are activated resulting in subsequent closure of the path (202) corresponding to first controllable switch $S_{11}$ (201) and the path (204) corresponding to second controllable switch $S_{12}$ (203) to couple the first energy source (101) with the input sides of both the first dc/dc power converter (104) and the second dc/dc power converter (105). Thus, the system is reconfigured in such a manner that the first energy source (101) is interfaced to the dc-link (106) by a parallel arrangement of two dc/dc power converters thereby enabling the first energy source (101) to deliver the required power to the load (107) through both the dc/dc power converters configured in parallel. During this mode of operation all of the other remaining controllable switches (205 and 207) are kept deactivated.

FIG. 5b illustrates a representation of the block level schematic of switched reconfigurable multi-converter multi-source energy storage system (200) during the event of forward power delivery mode 3 when both the third controllable switch $S_{21}$ (205) and the fourth controllable switch $S_{22}$ (207) are activated resulting in subsequent closure of the path (206) corresponding to third controllable switch $S_{21}$ (205) and the path (208) corresponding to fourth controllable switch $S_{22}$ (207) to couple the second energy source (102) with the input sides of both the first dc/dc power converter (104) and the second dc/dc power converter (105). Thus, the system is reconfigured in such a manner that the second energy source (102) is interfaced to the dc-link (106) by a parallel arrangement of two dc/dc power converters thereby enabling the second energy source (102) to deliver the required power to the load (107) through both the dc/dc power converters configured in parallel. During this mode of operation all of the other remaining controllable switches (201 and 203) are kept deactivated.

FIG. 5c illustrates a representation of the block level schematic of switched reconfigurable multi-converter multi-source energy storage system (200) during the event of forward power delivery mode 3 when both of the first controllable switch S (201) and the fourth controllable switch $S_{22}$ (207) are activated resulting in subsequent closure of the path (202) corresponding to first controllable switch $S_{11}$ (201) and the path (208) corresponding to fourth controllable switch $S_{22}$ (207) to couple the first energy source (101) to the input side of the first dc/dc power converter (104) and the second energy source (102) with the input side of the second dc/dc power converter (105) respectively. Thus, the system is reconfigured in such a manner that both the first energy source (101) and the second energy source (102) are interfaced to the dc-link (106) with respective first dc/dc power converter (104) and the second dc/dc power converter (105) thereby enabling both the first energy source (101) and the second energy source (102) to deliver the required power to the load (107) through the first dc/dc power converter (104) and the second dc/dc power converter (105) respectively. During this mode of operation all of the other remaining controllable switches (203 and 205) are kept deactivated.

Figure 6A:
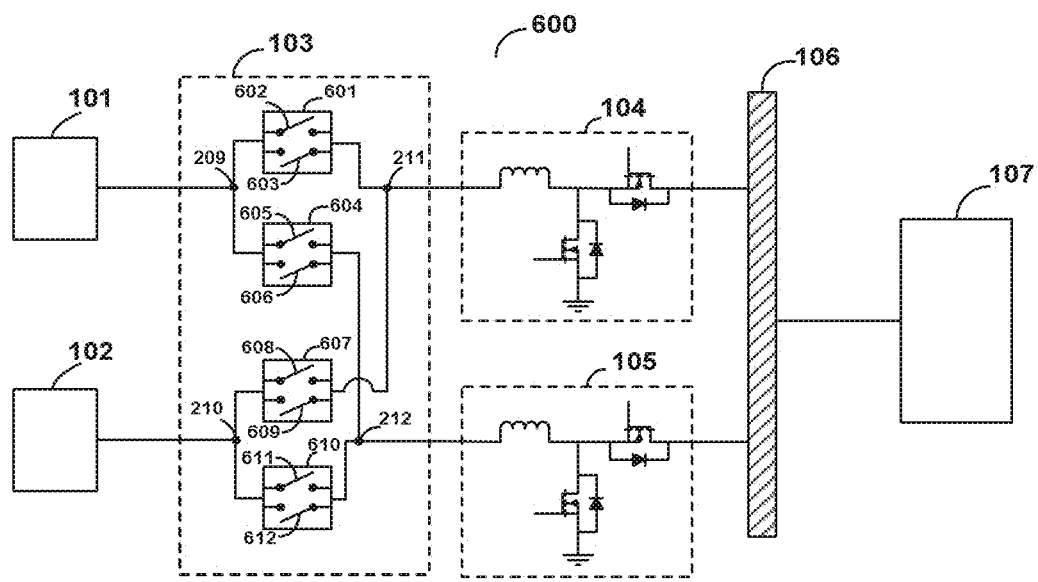
FIG. 6a illustrates another detailed representation of the block level schematic of switched reconfigurable multi-converter multi-source energy storage system with the controllable switches and the dc/dc power converters further realized as bidirectional, according to an embodiment of the present disclosure.

FIG. 6a represents another detailed representation of the block level schematic of switched reconfigurable multi-converter multi-source energy storage system (600) with the controllable switches and the dc/dc power converters further realized as bidirectional having the provision of allowing flow of power in both the directions i.e, from energy sources to the load side or vice versa. Accordingly, the bidirectional controllable switches are designated as the first controllable switch $S_{11}$ (601), second controllable switch $S_{12}$ (604), third controllable switch $S_{21}$ (607) and fourth controllable switch $S_{22}$ (610) respectively. The first controllable switch $S_{11}$ (601) is positioned between the first energy source (101) and the input side of the first dc/dc power converter (104) with it's one end being connected to the first energy source (101) through the common node (209) and the other end being connected to the input side of the first dc/dc power converter (104) through the common node (211). The first controllable switch $S_{11}$ (601) is activated resulting in either closure of the upper path (602) for allowing the forward flow of power from the first energy source (101) to the load (107) through the first dc/dc power converter (104) or closure of the lower path (603) for allowing the reverse flow of power from the load (107) to the first energy source (101) through the first dc/dc power converter (104). The second controllable switch $S_{12}$ (604) is positioned between the first energy source (101) and the input side of the second dc/dc power converter (105) with it's one end being connected to the first energy source (101) through the common node (209) and the other end being connected to the input side of the second dc/dc power converter (105) through the common node (212). The second controllable switch $S_{12}$ (604) is activated either resulting in closure of the upper path (605) for allowing the forward flow of power from the first energy source (101) to the load (107) through the second dc/dc power converter (105) or closure of the lower path (606) for allowing the reverse flow of power from the load (107) to the first energy source (101) through the second dc/dc power converter (105). The third controllable switch $S_{21}$ (607) is positioned between the second energy source (102) and the input side of the first dc/dc power converter (104) with it's one end being connected to the second energy source (102) through the common node (210) and the other end being connected to the input side of the first dc/dc power converter (104) through the common node (211). The third controllable switch Si 2 (607) is activated either resulting in closure of the upper path (608) for allowing the forward flow of power from the second energy source (101) to the load (107) through the first dc/dc power converter (104) or closure of the lower path (609) for allowing the reverse flow of power from the load (107) to the second energy source (102) through the first dc/dc power converter (104). The fourth controllable switch $S_{22}$ (610) is positioned between the second energy source (102) and the input side of the second dc/dc power converter (105) with it's one end being connected to the second energy source (102) through the common node (210) and the other end being connected to the input side of the second dc/dc power converter (105) through the common node (212). The fourth controllable switch $S_{22}$ (610) is activated either resulting in closure of the upper path (611) for allowing the forward flow of power from the second energy source (102) to the load (107) through the second dc/dc power converter (105) or closure of the lower path (612) for allowing the reverse flow of power from the load (107) to the second energy source (102) through the second dc/dc power converter (105).

Figure 6B:
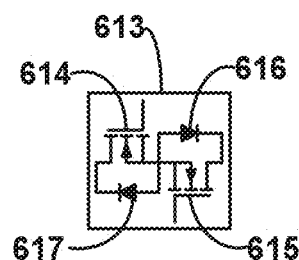
FIG. 6b illustrates the schematic of the controllable switches which are bidirectional in nature to permit bidirectional flow of power from both ends, according to an embodiment of the present disclosure.

FIG. 6b represents the schematic of the controllable switches which are bidirectional in nature to permit bidirectional flow of power from both ends i.e., from energy source to load during the operating modes of forward power delivery and from load to energy source during the operating modes of reverse power accumulation. Any of the four bidirectional controllable switches (601, 604, 607 and 610) can be practically realized as two MOSFETs each having an anti-parallel body diode being connected in back to back configuration with the source ends coupled together (613). The upper switch of one MOSFET (614) and the upper body diode of other MOSFET (616) together is analogous to the path (602, 605, 608 and 611) for the forward flow of load power from the energy source sides to the load side during the modes of forward power delivery for any controllable switch (601, 604, 607 and 610). Similarly, the lower switch of one MOSFET (615) and the lower body diode of other MOSFET (617) together is analogous to the path (603, 606, 609 and 612) for the reverse flow of regenerative power from the load side to the energy source side during the modes of reverse power accumulation for any controllable switch (601, 604, 607 and 610).

Figure 7A:
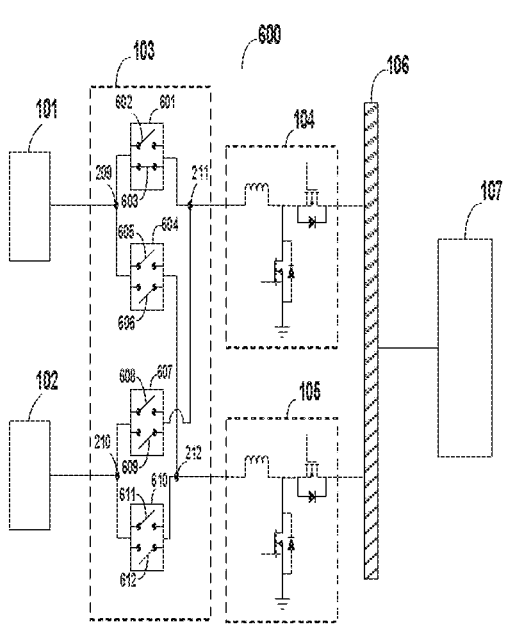
FIG. 7a illustrates a representation of the block level schematic of switched reconfigurable multi-converter multi-source energy storage system (200) during the event of reverse power accumulation Mode 1 when only the first controllable switch $S_{11}$ (601) is activated, according to an embodiment of the present disclosure.

FIG. 7a illustrates a representation of the block level schematic of switched reconfigurable multi-converter multi-source energy storage system (200) during the event of reverse power accumulation Mode 1 when only the first controllable switch $S_{11}$ (601) is activated resulting in closure of the lower path (603) to couple the first energy source (101) with the input side of the first dc/dc power converter (104) thereby enabling the first energy source (101) to recuperate the reverse regenerative power from the load (107) through the first dc/dc power converter (104). During this mode of operation all of the other remaining controllable switches (604, 607 and 610) are deactivated.

Figure 7B:
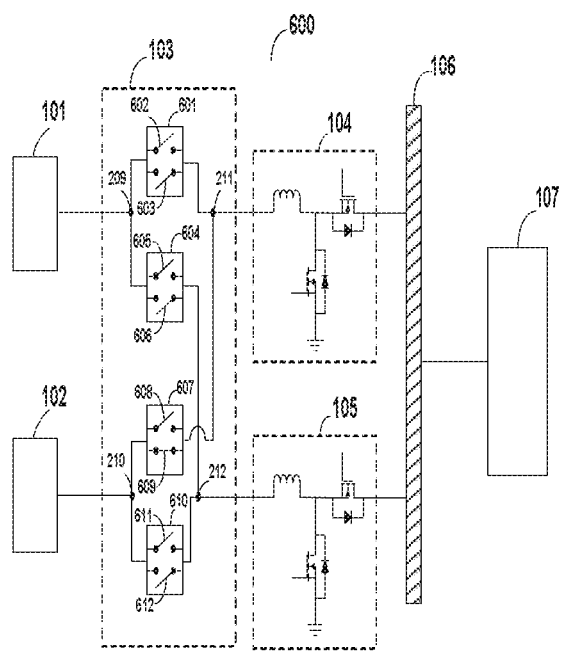
FIG. 7b illustrates a representation of the block level schematic of switched reconfigurable multi-converter multi-source energy storage system (200) during the event of reverse power accumulation mode 1 when only the third controllable switch $S_{21}$ (607) is activated, according to an embodiment of the present disclosure.

FIG. 7b illustrates a representation of the block level schematic of switched reconfigurable multi-converter multi-source energy storage system (200) during the event of reverse power accumulation mode 1 when only the third controllable switch $S_{21}$ (607) is activated resulting in closure of the lower path (609) to couple the second energy source (102) with the input side of the first dc/dc power converter (104) thereby enabling the second energy source (102) to recuperate the reverse regenerative power from the load (107) through the first dc/dc power converter (104). During this mode of operation all of the other remaining controllable switches (601, 604 and 610) are deactivated.

Figure 8A:
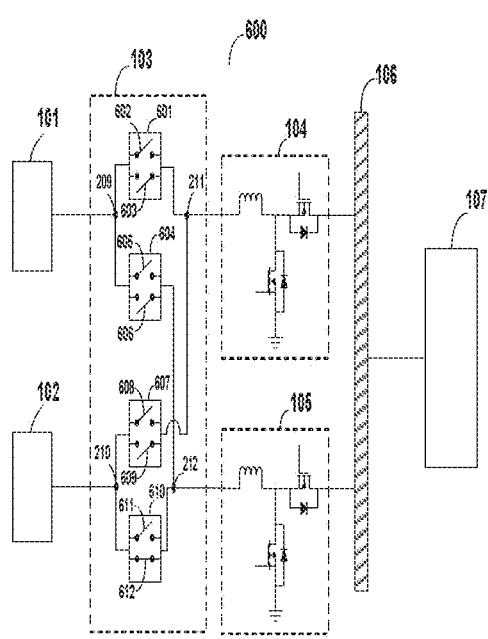
FIG. 8a illustrates a representation of the block level schematic of switched reconfigurable multi-converter multi-source energy storage system (200) during the event of reverse power accumulation mode 2 when only the fourth controllable switch $S_{22}$ (610) is activated, according to an embodiment of the present disclosure.

FIG. 8a illustrates a representation of the block level schematic of switched reconfigurable multi-converter multi-source energy storage system (200) during the event of reverse power accumulation mode 2 when only the fourth controllable switch $S_{22}$ (610) is activated resulting in closure of the lower path (612) to couple the second energy source (102) with the input side of the second dc/dc power converter (105) thereby enabling the second energy source (102) to recuperate the reverse regenerative power from the load (107) through the second dc/dc power converter (105). During this mode of operation all of the other remaining controllable switches (601, 604 and 607) are deactivated.

Figure 8B:
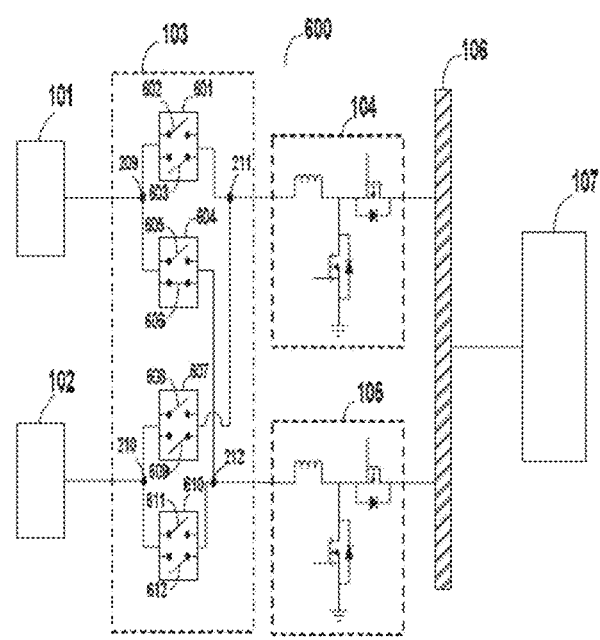
FIG. 8b illustrates a representation of the block level schematic of switched reconfigurable multi-converter multi-source energy storage system (200) during the event of reverse power accumulation mode 2 when only the second controllable switch $S_{12}$ (604) is activated, according to an embodiment of the present disclosure.

FIG. 8b illustrates a representation of the block level schematic of switched reconfigurable multi-converter multi-source energy storage system (200) during the event of reverse power accumulation mode 2 when only the second controllable switch $S_{12}$ (604) is activated resulting in closure of the lower path (606) to couple the first energy source (101) with the input side of the second dc/dc power converter (105) thereby enabling the first energy source (101) to recuperate the reverse regenerative power from the load (107) through the second dc/dc power converter (105). During this mode of operation all of the other remaining controllable switches (601, 607 and 610) are deactivated.

FIG. 9a illustrates a representation of the block level schematic of switched reconfigurable multi-converter multi-source energy storage system (200) during the event of reverse power accumulation mode 3 when both the first controllable switch $S_{11}$ (601) and the second controllable switch $S_{12}$ (604) are activated resulting in subsequent closure of the lower path (603) corresponding to first controllable switch $S_{11}$ (601) and the lower path (606) corresponding to second controllable switch $S_{12}$ (604) to couple the first energy source (101) with the input sides of both the first dc/dc power converter (104) and the second dc/dc power converter (105). Thus, the system is reconfigured in such a manner that the first energy source (101) is interfaced to the dc-link (106) by a parallel arrangement of two dc/dc power converters thereby enabling the first energy source (101) to recuperate the reverse regenerative power from the load (107) through both the dc/dc power converters configured in parallel. During this mode of operation all of the other remaining controllable switches (607 and 610) are kept deactivated.

FIG. 9b illustrates a representation of the block level schematic of switched reconfigurable multi-converter multi-source energy storage system (200) during the event of reverse power accumulation mode 3 when both the third controllable switch $S_{21}$ (607) and the fourth controllable switch $S_{22}$ (610) are activated resulting in subsequent closure of the lower path (609) corresponding to third controllable switch $S_{21}$ (607) and the lower path (612) corresponding to fourth controllable switch $S_{22}$ (610) to couple the second energy source (102) with the input sides of both the first dc/dc power converter (104) and the second dc/dc power converter (105). Thus, the system is reconfigured in such a manner that the second energy source (102) is interfaced to the dc-link (106) by a parallel arrangement of two dc/dc power converters thereby enabling the second energy source (102) to recuperate the reverse regenerative power from the load (107) through both the dc/dc power converters configured in parallel. During this mode of operation all of the other remaining controllable switches (607 and 610) are kept deactivated.

FIG. 9c illustrates a representation of the block level schematic of switched reconfigurable multi-converter multi-source energy storage system (200) during the event of reverse power accumulation mode 3 when both of the first controllable switch $S_{11}$ (601) and the fourth controllable switch $S_{22}$ (610) are activated resulting in subsequent closure of the lower path (603) corresponding to first controllable switch $S_{11}$ (601) and the lower path (612) corresponding to fourth controllable switch $S_{22}$ (610) to couple the first energy source (101) to the input side of the first dc/dc power converter (104) and the second energy source (102) to the input side of the second dc/dc power converter (105). Thus, the system is reconfigured in such a manner that both the first energy source (101) and the second energy source (102) are interfaced to the dc-link (106) with the respective first dc/dc power converter (104) and the second dc/dc power converter (105) thereby enabling both the first energy source (101) and the second energy source (102) to recuperate the reverse regenerative power from the load (107) through the first dc/dc power converter (104) and the second dc/dc power converter (105) respectively. During this mode of operation all of the other remaining controllable switches (604 and 607) are kept deactivated.

Figure 10:
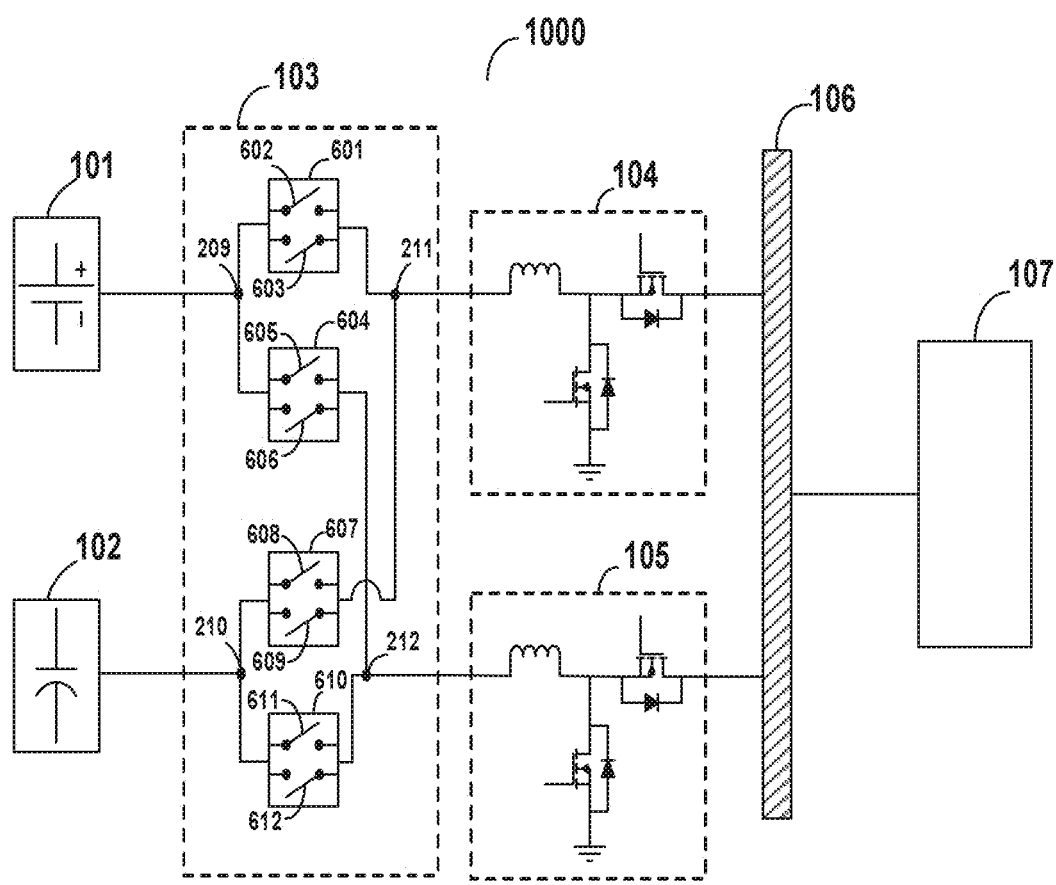
FIG. 10 represents a block level schematic of an exemplary embodiment of the present invention considering the first energy source as a battery or a battery pack and the second energy source as an ultracapacitor or an ultracapacitor pack, according to an embodiment of the present disclosure.

FIG. 10 represents a block level schematic of an exemplary embodiment of the present invention (1000) considering the first energy source (101) as a battery or a battery pack and the second energy source (102) as an ultracapacitor or an ultracapacitor pack.

Figure 11:
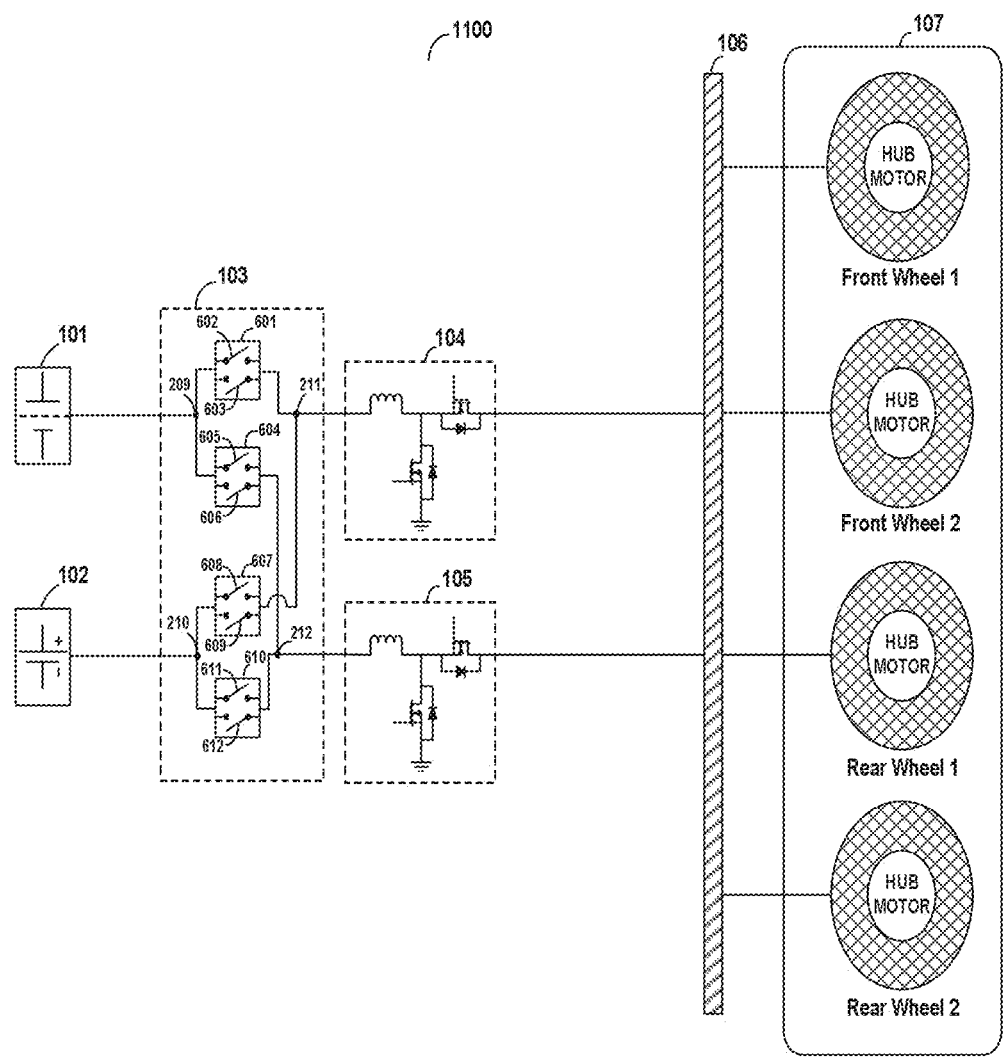
FIG. 11 represents a block level schematic of another exemplary embodiment of the present invention extending the field of application for an all-wheel drive electric vehicle, according to an embodiment of the present disclosure.

FIG. 11 represents a block level schematic of another exemplary embodiment of the present invention (1100) extending the field of application for an all-wheel drive electric vehicle having separate electric hub motors connected to each of the wheels of the vehicles. The switched reconfigurable multi converter multi source energy source is realized considering the first energy source (101) as a fuel cell or a fuel cell stack, the second energy source (102) as a battery or a battery pack and the load (107) is realized as four electric hub motor driven wheels of an electrified vehicle.

Figure 12:
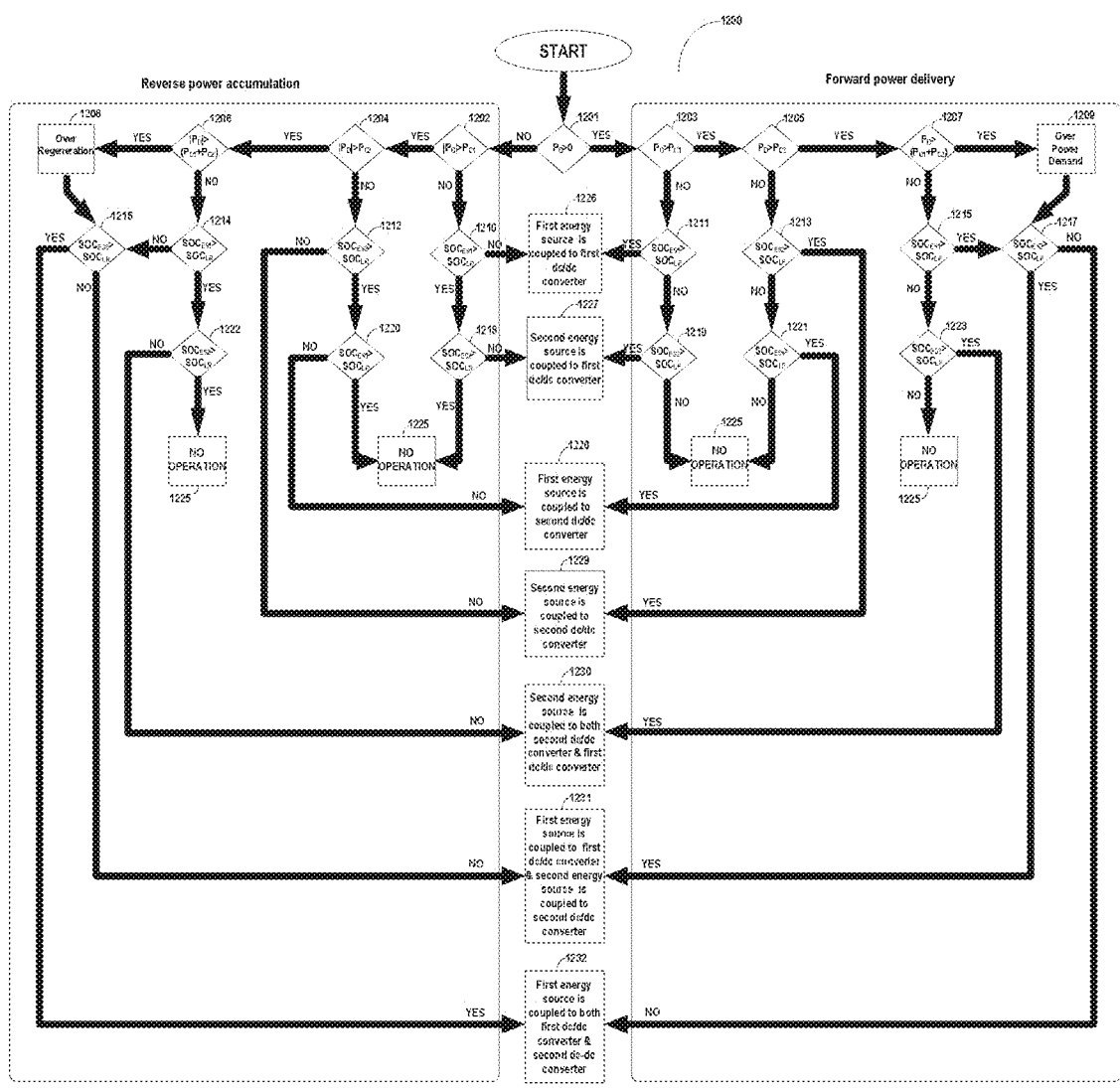
FIG. 12 represents a flow chart to describe the power flow control scheme for the switched reconfigurable multi-converter multi-source energy storage system, according to an embodiment of the present disclosure.

FIG. 12 represents a flow chart (1200) to describe the power flow control scheme for the switched reconfigurable multi-converter multi-source energy storage system according to an embodiment of the invention. The different conditions based upon deciding parameters in the flow chart are stated in diamonds whereas the result and decisions are declared within rectangles. The right wing of the flowchart represents the conditions responsible for the system operation during different modes of forward power delivery whereas, on the other hand the left wing of the flow chart represents the conditions responsible for the system operation during the different modes of reverse power accumulation.

The flowchart begins with a condition stated in diamond 1201 where the controller (108) determines the nature of the load power demand to ascertain the operation of the system in either the forward power delivery mode or the reverse power accumulation mode. If the condition stated in the diamond 1201 is satisfied i.e., when the load power demand is greater than zero, the system is scheduled to operate in the forward power delivery mode to maneuver the flow of power from the energy source side to the load side. Subsequently, the flowchart moves in the direction indicated by the bold arrow towards the next condition as stated in diamond 1203 where the controller (108) compares the load power demand with the power rating of the first dc/dc power converter (104). When the power demand is within the power rating limit of the first dc/dc power converter (104), the controller (108) further determines the SOC level of the first energy source (101) in the next condition as stated in diamond 1211 and if the SOC of the first energy source (101) is greater than the threshold level $SOC_{LF}$, the controller (108) implements the decision of coupling the first energy source (101) to the first dc/dc power converter (104) as depicted in the rectangle 1226 to deliver the load power from the first energy source (101) through the first dc/dc power converter (104). Else, if the condition in the diamond 1211 is not satisfied, the controller (108) further determines the SOC level of the second energy source (102) in the condition stated in diamond 1219. If the SOC level of the second energy source (102) is greater than the threshold level $SOC_{LF}$, the controller (108) implements the decision of coupling the second energy source (102) to the input side of the first dc/dc power converter (104) as declared in rectangle 1227 to deliver the load power from the second energy source (102) through the first dc/dc power converter (104) otherwise, the system is driven to the 'NO OPERATION' state as designated within the rectangle 1225.

However, when the power demand is greater than the power rating of the first dc/dc power converter (104) upon satisfaction of the condition stated in diamond 1203 the controller (108) further compares the power demand with the power rating of the second dc/dc power converter (105) in the condition stated in diamond 1205. When the power demand is within the power rating limit of the second dc/dc power converter (105), the controller (108) determines the SOC level of the second energy source (102) by the condition provided in diamond 1213 and if the SOC level of the second energy source (102) is greater than the threshold level $SOC_{LF}$, the controller (108) implements the decision of coupling the second energy source (102) to the input side of the second dc/dc power converter (105) as declared in the rectangle 1229 to deliver the load power from the second energy source (102) through the second dc/dc power converter (105). Otherwise, when the condition of diamond 1213 is not satisfied i.e. if the SOC of second energy source (102) is below the threshold level $SOC_{LF}$, the controller (108) further determines the SOC level of the first energy source (101) as depicted in the condition in diamond 1221. If the SOC of the first energy source (101) is greater than the threshold level $SOC_{LF}$ according to the condition stated in diamond 1221, the controller (108) implements the decision of coupling the first energy source (101) to the input side of the second dc/dc power converter (105) as declared in the rectangle 1228 to deliver the load power from the first energy source (101) through the second dc/dc power converter (105). When the respective SOC levels of both the first energy source (101) and second energy source (102) are less than the threshold level $SOC_{LF}$, the system is driven to the 'NO OPERATION' state as designated in the rectangle 1225.

Nevertheless, when the power demand is even greater than the power rating of the second dc/dc power converter (105) ensuing in satisfaction of the condition mentioned in diamond 1205, the controller (108) further compares the power demand with the combined power ratings of both the dc/dc power converters as per the condition stated in diamond 1207. When the power demand is within the limit of combined power ratings of both the dc/dc power converters, the controller (108) subsequently determines the SOC level of both the first energy source (101) as well as the second energy source (102) thereby resulting in three distinct switching methods for reconfiguration. When the SOC level of both first energy source (101) and second energy source (102) is greater than the threshold level $SOC_{LF}$ i.e. on fulfillment of the conditions stated in diamond 1215 and diamond 1217 respectively, the controller (108) implements the decision of coupling the first energy source (101) to the first dc/dc power converter (104) and coupling the second energy source (102) to the second dc/dc power converter (105) as declared in rectangle 1231 thereby maneuvering the forward flow of power to the load from both the energy source through both the dc/dc power converters to meet the required load demand. When the SOC level of only the first energy source (101) is greater than the threshold level $SOC_{LF}$ i.e. on fulfillment of condition stated in diamond 1215 and non-fulfillment of condition stated in diamond 1217, the controller (108) implements the decision of coupling the first energy source (101) to the input side of both the first dc/dc power converter (104) and the second dc/dc power converter (105) as mentioned in rectangle 1232 thereby maneuvering the forward flow of power to the load from the first energy source through both the dc/dc power converters configured in parallel with each other. In the similar approach, when the SOC level of only the second energy source (102) is greater than the threshold level $SOC_{LF}$ based upon the fulfillment of condition stated in diamond 1223 and non-fulfillment of condition stated in diamond 1215, the controller (108) implements the decision of coupling the second energy source (102) to the input side of both the first dc/dc power converter (104) and the second dc/dc power converter (105) as declared in rectangle 1230 thereby maneuvering the forward flow of power from the second energy source to the load through both the dc/dc power converters configured in parallel with each other. However, when both the first energy source (101) and the second energy source (102) are incapable of supplying the required load demands i.e. their SOC levels are below their respective threshold levels with non-fulfillment of both the conditions stated in diamond 1215 and diamond 1223 respectively, the controller (108) drives the system to the 'NO OPERATION' state designated in rectangle 1225. Furthermore, when the load power demand is even more than the combined power ratings of both the dc/dc power converter the controller (108) configures the system to deliver the maximum possible power which is equivalent to combined power ratings of the two dc/dc power converters and consequently the system is operated following the conditions stated in the aforementioned case.

Likewise, in a similar sequence of conditions the controller (108) also operates the system during the reverse power accumulation modes to maneuver the reverse flow of power from load to energy source for recuperating the regenerative energy when the load (107) undergoes regeneration. By the condition stated in diamond 1201, when the power demand is less than zero the system is scheduled to operate in reverse power accumulation mode. Consequently, the controller (108) determines the next condition stated in diamond 1202 where the controller (108) compares the regenerative power with the power rating of the first dc/dc power converter (104). When the regenerative power is within the power rating limit of the first dc/dc power converter (104), the controller (108) further determines the SOC level of the first energy source (101) in the next condition as stated in diamond 1210 and if the SOC of the first energy source (101) is below the threshold level $SOC_{LR}$ the controller (108) implements the decision of coupling the first energy source (101) to the first dc/dc power converter (104) as depicted in the rectangle 1226 to accumulate the regenerative power from the load (107) in the first energy source (101) through the first dc/dc power converter (104). Else, if the condition mentioned in the diamond 1210 is satisfied i.e. when the SOC of first energy source (101) is greater than the threshold level $SOC_{LR}$ the controller (108) further determines the SOC level of the second energy source (102) in the condition stated in diamond 1218. If the condition of diamond 1218 is not fulfilled i.e., the SOC level of the second energy source (102) is below the threshold level $SOC_{LR}$, the controller (108) implements the decision of coupling the second energy source (102) to the input side of the first dc/dc power converter (104) to recuperate the regenerative power from the load (107) in the second energy source (102) through the first dc/dc power converter (104) depicted in rectangle 1227 otherwise the system is driven to the 'NO OPERATION' state as designated within the rectangle 1225.

However, when the regenerative power is greater than the power rating of the first dc/dc power converter (104) satisfying the condition stated in diamond 1202, the controller (108) compares the regenerative power with the power rating of the second dc/dc power converter (105) in the condition stated in diamond 1204. If the regenerative power is within the power rating limit of the second dc/dc power converter (105), the controller (108) determines the SOC level of the second energy source by the condition provided in diamond 1212 and if the SOC level of the second energy source (102) is lesser than the threshold level $SOC_{LR}$, the controller (108) implements the decision of coupling the second energy source (102) to the input side of the second dc/dc power converter (105) as declared in the rectangle 1229 to recuperate the regenerative power from the load (107) in the second energy source (102) through the second dc/dc power converter (105). Otherwise, when the condition of diamond 1212 is fulfilled i.e. if the SOC of second energy source (102) is greater than the threshold level $SOC_{LR}$, the controller (108) further determines the SOC level of the first energy source (101) as depicted in the condition in diamond 1220. If the SOC of the first energy source (101) is below the threshold level $SOC_{LR}$ according to the condition stated in diamond 1220, the controller (108) implements the decision of coupling the first energy source (101) to the input side of the second dc/dc power converter (105) as declared in the rectangle 1228 to recuperate the regenerative power from the load (107) in the first energy source (101) through the second dc/dc power converter (105). When the respective SOC levels of both the first energy source (101) and second energy source (102) are greater than the threshold level $SOC_{LR}$ i.e. none of the energy source are capable of accumulating the regenerative power, the system is driven to the 'NO OPERATION' state as designated in the rectangle 1225.

Nevertheless, when the regenerative power is even greater than the power rating of the second dc/dc power converter (105) ensuing in satisfaction of the condition mentioned in diamond 1204, the controller (108) further compares the regenerative power with the combined power ratings of both the dc/dc power converters according to the condition stated in diamond 1206. When the regenerative power is within the limit of combined power ratings of both the dc/dc power converter, the controller (108) subsequently determines the SOC level of both the first energy source (101) as well as the second energy source (102) thereby resulting in three distinct switching methods for reconfiguration of the system. When the SOC level of both first energy source (101) and second energy source (102) is below the threshold level $SOC_{LR}$ i.e. upon non-fulfillment of the conditions mentioned in diamond 1214 and diamond 1216 respectively, the controller (108) implements the decision of coupling the first energy source (101) to the first dc/dc power converter (104) and coupling the second energy source (102) to the second dc/dc power converter (105) thereby maneuvering the reverse flow of power from the load (107) during regeneration through both the dc/dc power converters to recuperate the regenerative power in both the first energy source (101) and second energy source (102). When the SOC level of only the first energy source (101) is less than the threshold level $SOC_{LR}$, the controller (108) implements the decision of coupling the first energy source (101) to the input side of both the first dc/dc power converter (104) and the second dc/dc power converter (105) thereby maneuvering reverse flow of power from the load (107) during regeneration through both the dc/dc power converters configured in parallel with each other to recuperate the regenerative power entirely in the first energy source (101). In the similar manner, when the SOC level of only the second energy source (102) is less than the threshold level $SOC_{LR}$, the controller (108) implements the decision of coupling the second energy source (102) to the input side of both the first dc/dc power converter (104) and the second dc/dc power converter (105) thereby maneuvering the reverse flow of power from the load (107) during regeneration through both the dc/dc power converters configured in parallel with each other to recuperate the regenerative power entirely in the second energy source (102). However, when both the first energy source (101) and the second energy source (102) are incapable of accumulating the regenerative power from the load (107) i.e., their SOC levels are greater than the threshold level, the system is driven to the 'NO OPERATION' state designated in rectangle 1225 by the controller (108). Furthermore, when the regenerative power is even more than the combined power ratings of both the dc/dc power converter the controller (108) configures the system to accept the maximum possible regenerative power equivalent to combined power ratings of the two dc/dc power converters and consequently the system is reconfigured following the conditions stated in the aforementioned case.

Figure 13:
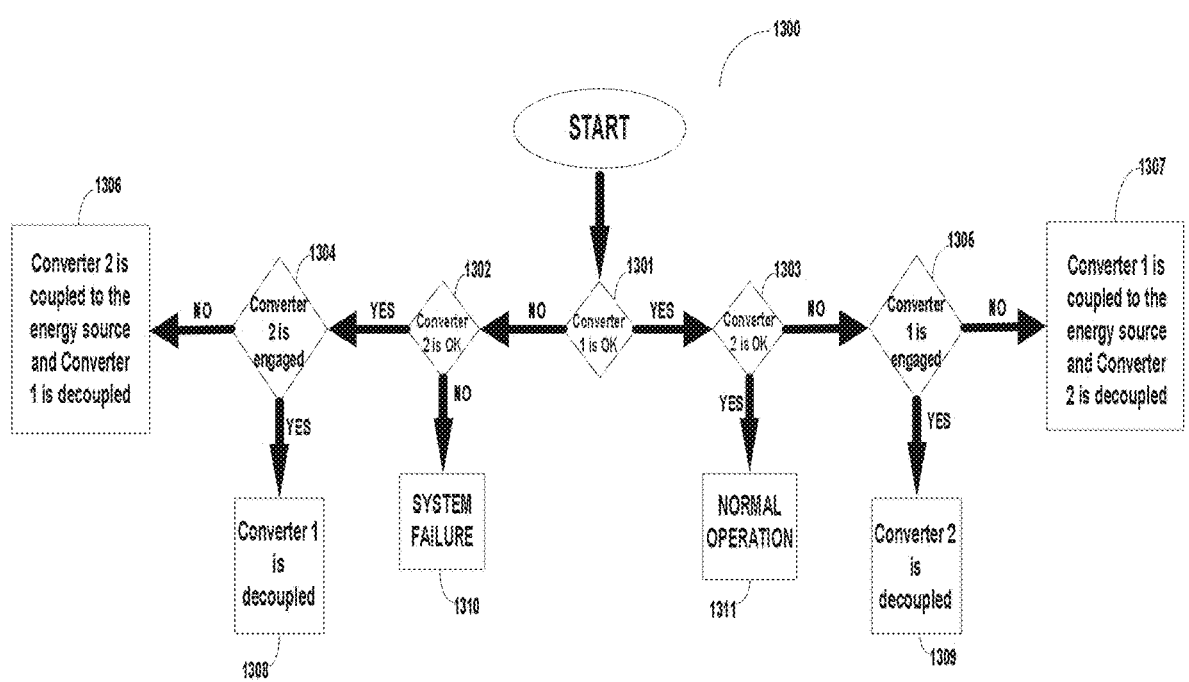
FIG. 13 represents the flow chart for fault tolerant control scheme of the switched reconfigurable multi-converter multi-source energy storage system, according to an embodiment of the present disclosure.
Figure 14A:
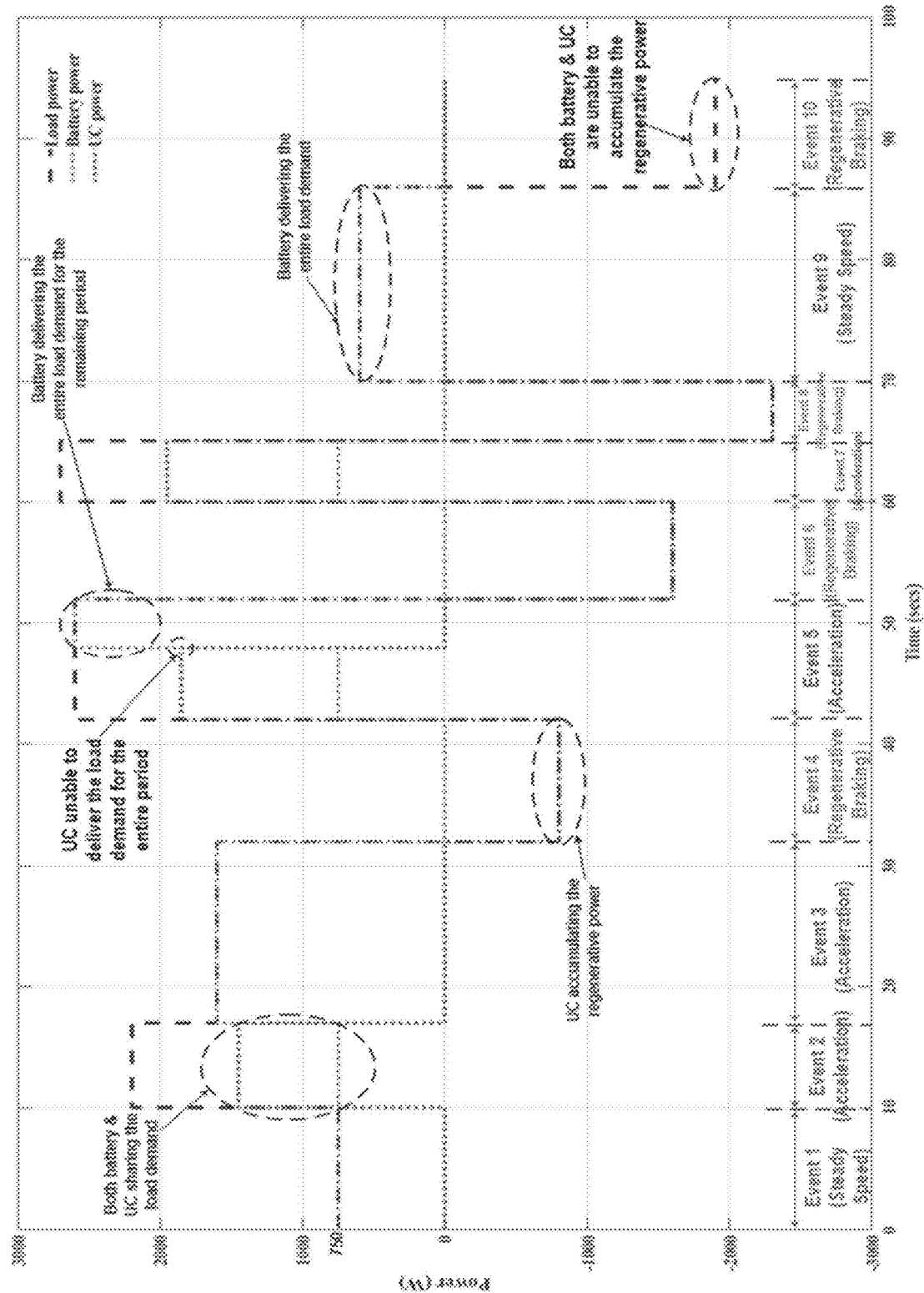
FIG. 14a presents a diagram of the power sharing between the battery and ultracapacitor with respect to the load power profile.
Figure 14B:
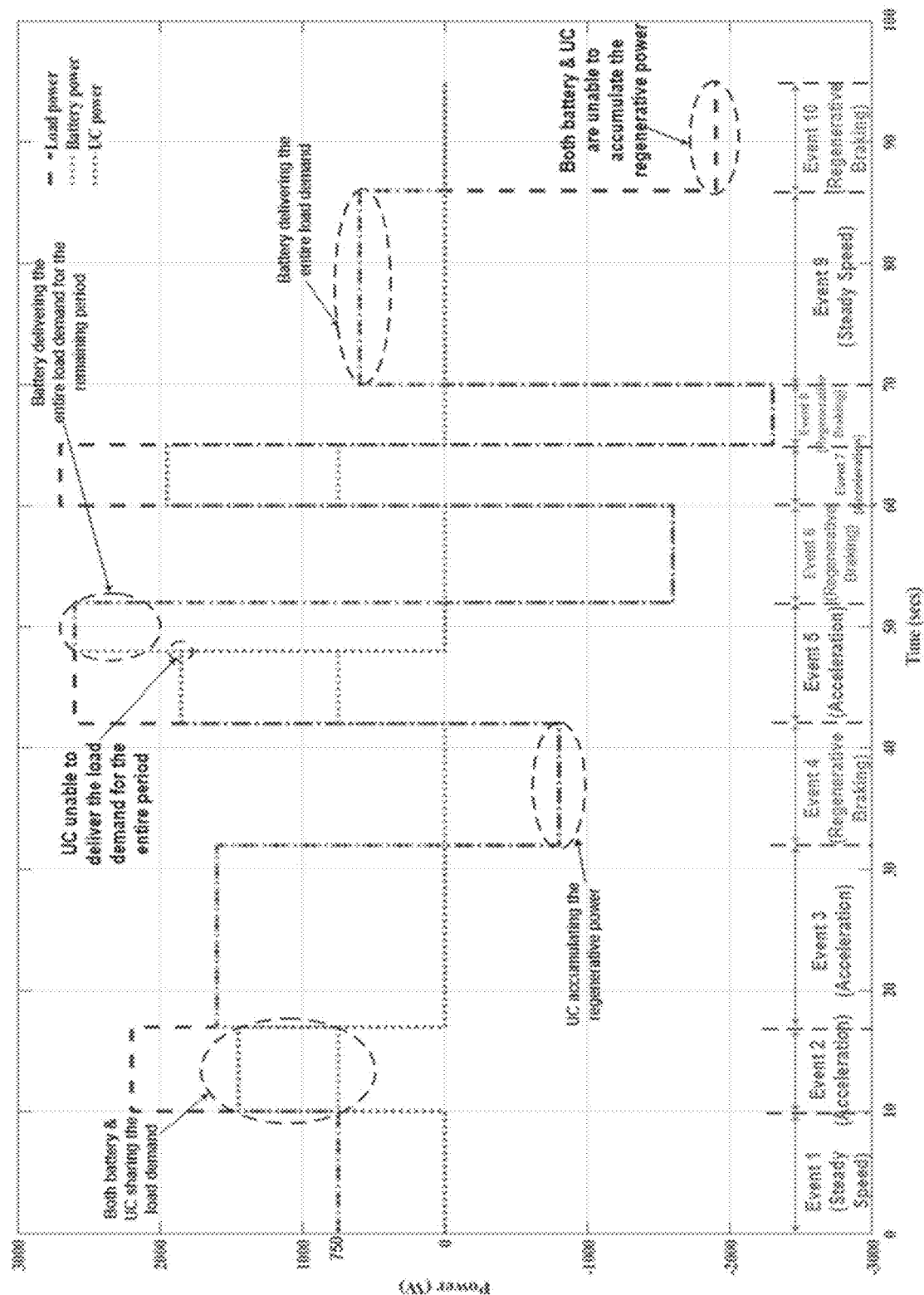
FIG. 14b presents State of Change (%) of battery power with respect to load power profile.
Figure 14C:
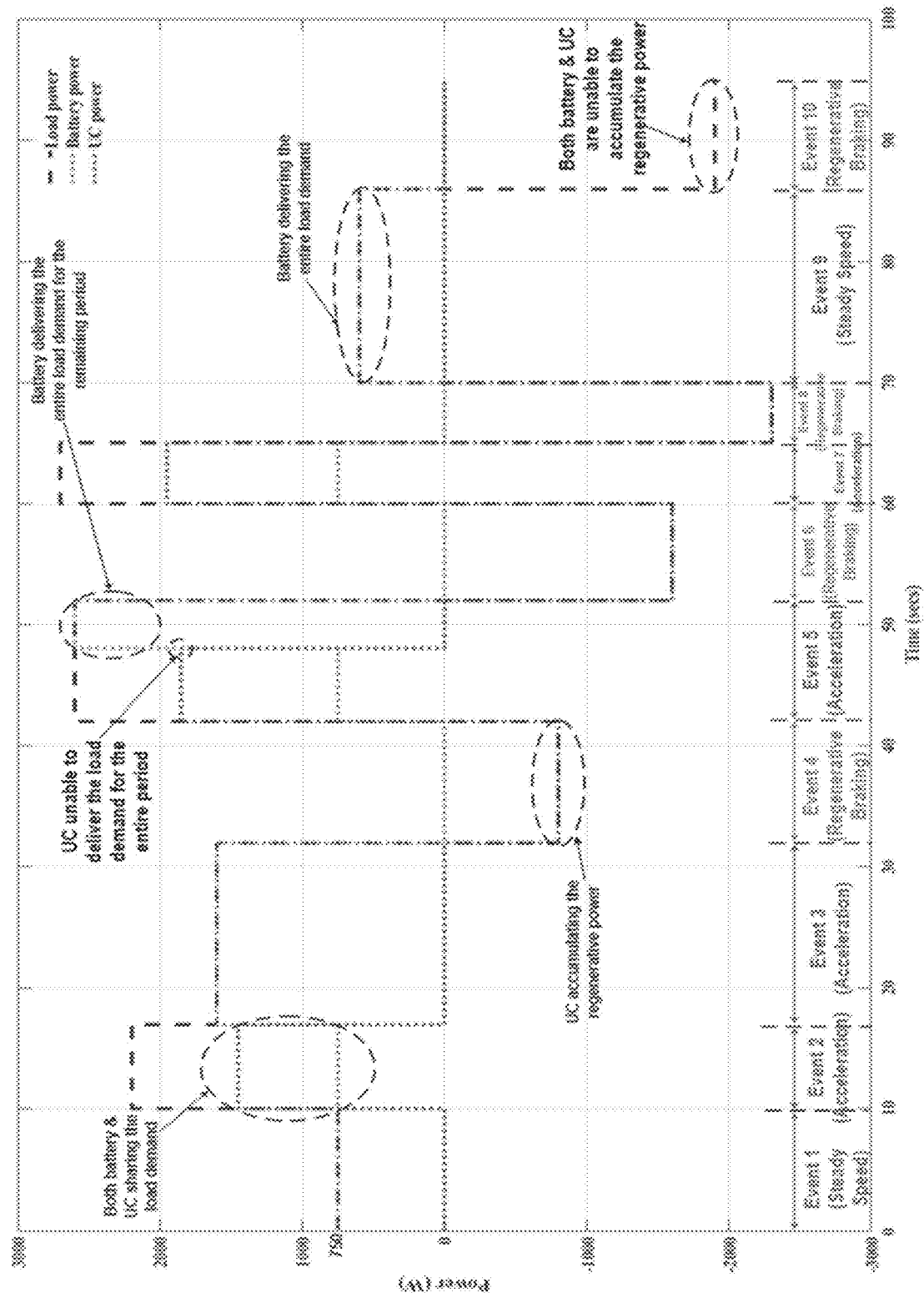
FIG. 14c presents State of Change (%) of ultracapacitor power with respect to load power profile.

FIG. 13 represents the flow chart 1300 for fault tolerant control scheme of the switched reconfigurable multi-converter multi-source energy storage system according to a preferred embodiment of the invention.

The flow chart begins with a condition stated in diamond 1301 where the controller (108) determines the functionality of the first dc/dc power converter (104) to ascertain the occurrence of fault within the first dc/dc power converter (104). Subsequently the controller (108) also determines the functionality of the second dc/dc power converter (105) in the conditions mentioned in diamonds 1302 and 1303. If both the dc/dc power converters are functioning effectively without any prevalence of fault, the controller (108) asserts the system to be qualified for normal operation as designated in rectangle 1311. If the second dc/dc power converter (105) encounters any fault and only the first dc/dc power converter (104) is functioning properly, the controller (108) further evaluates whether the first dc/dc power converter (104) is already engaged in any operation being coupled to any of the energy sources through the condition depicted in diamond 1305. If the condition stated in diamond 1305 is not satisfied i.e., the first dc/dc power converter (104) is idle without being coupled to any energy source, the controller (108) implements the decision mentioned in rectangle 1307 of coupling the first dc/dc power converter (104) to the energy source capable for operation by activating the respective switches depending upon the mode of operation and nature of power flow based upon the power flow control scheme whereas the second dc/dc power converter (105) is completely decoupled from the system by deactivating the respective switches. Otherwise, if the first dc/dc power converter (104) is already engaged in operation being coupled to any of the energy source, the controller (108) performs the method of only decoupling the faulty second dc/dc power converter (105) by deactivating the respective switches as declared in rectangle 1309. In a similar manner, if only the second dc/dc power converter (105) is functioning properly with the first dc/dc power converter (104) encountering any fault, the controller (108) further evaluates whether the second dc/dc power converter (105) is already engaged in any operation being coupled to any of the energy source as per the condition depicted in diamond 1304. If the condition stated in diamond 1304 is not satisfied the second dc/dc power converter (105) is idle without being coupled to any of the energy source, the controller (108) implements the decision mentioned in rectangle 1306 of coupling the second dc/dc power converter (105) to the energy source capable for operation by activating the respective switches depending upon the mode of operation and nature of power flow based upon the power flow control scheme while the faulty first dc/dc power converter (104) is completely decoupled from the system by deactivating the respective switches. Otherwise, if the second dc/dc power converter (105) is already engaged in operation being coupled to any of the energy source, the controller (108) performs the method of only decoupling the faulty first dc/dc power converter (104) by deactivating the respective switches as declared in rectangle 1308. In scenarios where both the dc/dc power converters become faulty, the controller (108) implements the decision of decoupling both the dc/dc power converters from the system by deactivating the respective controllable switches thereby declaring the system as failure mentioned in rectangle 1310.

Accordingly the present invention provides a Switched Reconfigurable Multi-Converter Multi-Source Energy Storage System Configuration for Electrified Vehicles and Power Flow Control Scheme Thereof, which comprises a first energy source (101), a second energy source (102), a first dc/dc power converter (104), a second dc/dc power converter (105) of equal or unequal power rating with respect to first dc/dc power converter (104), a mode selector switching module (103) further comprising of plurality of controllable switches and a controller (108) wherein, the first energy source (101) can be either coupled to or decoupled from the input of the first dc/dc power converter (104) by activating or deactivating the first controllable switch (201) of the mode selector switching module (103); the first energy source (101) can be either coupled to or decoupled from the input of the second dc/dc power converter (105) by activating or deactivating the second controllable switch (203) of the mode selector switching module (103); the second energy source (102) can be either coupled to or decoupled from the input of the first dc/dc power converter (104) by activating or deactivating the third controllable switch (205) of the mode selector switching module (103); the second energy source (102) can be either coupled to or decoupled from the input of the second dc/dc power converter (105) by activating or deactivating the fourth controllable switch (207) of the mode selector switching module (103); the output side of both the first dc/dc power converter (104) and second dc/dc power converter (105) is directly coupled to a common dc-link (106) supplying a load (107) corresponding to the motor drivetrain of the electrified vehicle; the controller (108) executes a power flow control scheme to implement the methods of switching by activating or deactivating any of the four controllable switches of the mode selector switching module (103) for reconfiguring the system in forward power delivery mode to deliver the power from energy source (101, 102) to the load (107) or reverse power accumulation mode to accumulate the regenerative power from load (107) to the energy source (101, 102).

In an embodiment of the present invention with reference to FIG. 3a and FIG. 3b, a method of switching is provided to reconfigure the multi-converter multi-source energy storage system during the event of forward power delivery mode 1 when the load (107) demands a power within the limit of power rating of the first dc/dc power converter (104). The method comprises of either coupling the first energy source (101) to the input side of the first dc/dc power converter (104) by activating the switch $S_{11}$ (201) to deliver the load power from the first energy source (101) through the first dc/dc power converter (104) as shown in FIG. 3a, or by coupling the second energy source (102) to the input side of the first dc/dc power converter (104) by activating the switch $S_{21}$ (205) to deliver the power to the load (107) from the second energy source (102) through the first dc/dc power converter (104) as shown in FIG. 3b, depending upon the SOC of the respective energy sources.

In another embodiment of the present invention with reference to FIG. 4a and FIG. 4b, a method of switching is provided to reconfigure the multi-converter multi-source energy storage system during the event of forward power delivery mode 2 when the load (107) demands a power within the limit of power rating of the second dc/dc power converter (105). The method comprises of either coupling the second energy source (102) to the input side of the second dc/dc power converter (105) by activating the switch $S_{22}$ (207) to deliver the load power from the second energy source (102) through the second dc/dc power converter (105) as shown in FIG. 4a, or coupling the first energy source (101) to the input side of the second dc/dc power converter (105) by activating the switch $S_{12}$ (203) to deliver the power to the load (107) from the first energy source (101) through the second dc/dc power converter (105) as shown in FIG. 4b, depending upon the SOC of the respective energy sources.

In yet another embodiment of the present invention with reference to FIG. 5a, FIG. 5b and FIG. 5c, a method of switching is provided to reconfigure the multi converter multi source energy storage system during the event of forward power delivery mode 3 when the load (107) demands a power greater than the individual power ratings of the dc/dc power converters but within the limit of combined power ratings of both the first dc/dc power converter (104) and second dc/dc power converter (105). The method comprises of three distinct variants of reconfiguration depending upon the SOC of the respective energy sources by means of either coupling the first energy source (101) to the input side of both the first dc/dc power converter (104) and second dc/dc power converter (105) by activating the switches $S_{11}$ (201) and $S_{12}$ (203) respectively to deliver the power to the load (107) from the first energy source (101) through both the dc/dc power converters configured in parallel with each other as shown in FIG. 5a; or by coupling the second energy source (102) to the input side of both the second dc/dc power converter (105) and first dc/dc power converter (104) by activating the switches $S_{22}$ (207) and $S_{21}$ (205) respectively to deliver the power to the load (107) from the second energy source (102) through both the dc/dc power converters configured in parallel with each other as shown in FIG. 5b; or coupling the first energy source (101) to the input side of the first dc/dc power converter (104) by activating the switch $S_{11}$ (201) and coupling the second energy source (102) to the input side of the second dc/dc power converter (105) by activating the switch $S_{22}$ (207) to deliver the power to the load (107) from both the energy sources through both the dc/dc power converters coupled individually with each energy source as shown in FIG. 5c.

In still another embodiment of the present invention with reference to FIG. 7a and FIG. 7b, considering the controllable switches and the dc/dc power converters are bidirectional, a method of switching is provided to reconfigure the multi converter multi source energy storage system during the event of reverse power accumulation mode 1 when the load (107) regenerates a reverse power within the limit of power rating of the first dc/dc power converter (104). The method comprises of either coupling the first energy source (101) to the input side of the first dc/dc power converter (104) by activating the switch $S_{11}$ (601) to accumulate the regenerative power from the load (107) in the first energy source (101) as shown in FIG. 7a or coupling the second energy source (102) to the input side of the first dc/dc power converter (104) by activating the switch $S_{21}$ (607) to recuperate the regenerative power from the load (107) in the second energy source (102) as shown in FIG. 7b depending upon the SOC of the respective energy sources.

In yet another embodiment of the present invention with reference to FIG. 8a and FIG. 8b, considering the controllable switches and the dc/dc power converters are bidirectional, a method of switching is provided to reconfigure the multi converter multi source energy storage system during the event of reverse power accumulation mode 2 when the load (107) regenerates a reverse power within the limit of power rating of the second dc/dc power converter (105). The method comprises of either coupling the second energy source (102) to the input side of the second dc/dc power converter (105) by activating the switch $S_{22}$ (610) to accumulate the regenerative power from the load (107) in the second energy source (102) as shown in FIG. 8a or coupling the first energy source (101) to the input side of the second dc/dc power converter (105) by activating the switch $S_{12}$ (604) to recuperate the regenerative power from the load (107) in the first energy source (101) as shown in FIG. 8b depending upon the SOC of the respective energy sources.

In still another embodiment of the present invention with reference to FIG. 9a, FIG. 9b and FIG. 9c, considering the controllable switches and the dc/dc power converters are bidirectional, a method of switching is provided to reconfigure the multi converter multi source energy storage system during the event of reverse power accumulation mode 3 when the load (107) regenerates a reverse power greater than the individual power ratings of the dc/dc power converter but within the limit of combined power ratings of both the first dc/dc power converter (104) and second dc/dc power converter (105). The method comprises of three distinct variants of reconfiguration depending upon the SOC of the respective energy sources by means of either coupling the first energy source (101) to the input side of both the first dc/dc power converter (104) and second dc/dc power converter (105) by activating the switches $S_{11}$ (601) and Sit (604) respectively to recuperate the regenerative power from the load (107) in the first energy source (101) through both the dc/dc power converters configured in parallel with each other as shown in FIG. 9a; or coupling the second energy source (102) to the input side of both the second dc/dc power converter (105) and first dc/dc power converter (104) by activating the switches 522 (610) and $S_{21}$ (607) respectively to accumulate the regenerative power from the load (107) in the second energy source (102) through both the dc/dc power converters configured in parallel with each other as shown in FIG. 9b; or coupling the first energy source (101) to the input side of the first dc/dc power converter (104) by activating the switch $S_{11}$ (601) and coupling the second energy source (102) to the input side of the second dc/dc power converter (105) by activating the switch $S_{22}$ (610) to accumulate the regenerative power from the load (107) in both the energy sources through both the dc/dc power converters coupled individually with each energy source as shown in FIG. 9c.

In yet another exemplary embodiment of the present invention with reference to FIG. 10, a switched reconfigurable multi-converter multi-source energy storage system configuration (1000) is provided which comprises of battery as the first energy source (101) and ultracapacitor as the second energy source (102), a mode selector switching module (103) further comprising of a plurality of controllable switches, two numbers of dc/dc power converters coupled to a common dc link (106) feeding electric motor drive system (107) of an electrified vehicle.

In still another exemplary embodiment of the present invention with reference to FIG. 11, a switched reconfigurable multi-converter multi-source energy storage system configuration (1100) is provided which comprises of fuel cell as the first energy source (101), battery as the second energy source (102), a mode selector switching module (103) further comprising of a plurality of controllable switches, two numbers of dc/dc power converters coupled to a common dc link (106) feeding four separate electric hub motors for driving four wheels (107) of an electrified vehicle.

In yet another preferred embodiment of the present invention with reference to FIG. 12, a power flow control scheme (1200) is provided to execute the different dynamic switching methods of reconfiguration depending upon the nature of load power, load power level, power ratings of the dc/dc power converters and SOC of energy sources, for maneuvering the flow of power within the system during diverse events of forward power delivery and reverse power accumulation.

In still another preferred embodiment of the present invention with reference to FIG. 13, a fault tolerant control scheme (1300) is provided for executing the switching method to reconfigure the system when either of the dc/dc power converters encounters any fault during operation. The method comprises of decoupling the energy source from the faulty dc/dc power converter by deactivating the respective switches and accordingly coupling the energy source to the non-faulty dc/dc power converter by activating the respective switches if and only if the non-faulty dc/dc power converter is not engaged in any operation, thereby ensuring fail-safe operation of the system.

EXAMPLES

The following examples are given by way of illustration of the working of the invention in actual practice and therefore should not be constructed to limit the scope of the present invention.

Example 1

The following example demonstrates a typical working scenario of the switched reconfigurable multi-converter multi-source energy storage system configuration comprising of battery and ultracapacitor as the two energy sources, two bidirectional dc/dc power converters of unequal power ratings and four numbers of controllable switches intended for a mini electric vehicle application. The different parameter descriptions of the system are shown in Table 2.

TABLE 2

| Parameters | Description |
| --- | --- |
| Battery specifications | 24 V, 48 Ah |
| Ultracapacitor specifications | 174 F, 16.2 V |
| DC-link voltage | 48 V |
| First dc/dc power converter (battery side) type | Bidirectional Buck Boost |
| Input voltage range of first dc/dc power converter | 8 V to 32 V |
| Output voltage range of first dc/dc power converter | 36 V to 62 V |
| Power rating first dc/dc power converter | 1 kW |
| Second dc/dc power converter (ultracapacitor side) type | Bidirectional Buck Boost |
| Input voltage range of second dc/dc power converter | 8 V to 32 V |
| Output voltage range of second dc/dc power converter | 36 V to 62 V |
| Power rating second dc/dc power converter | 2 kW |
| Threshold level of SOC for battery during forward power delivery ($SOC_{battF}$) | 20% |
| Threshold level of SOC for ultracapacitor during forward power delivery ($SOC_{ucF}$) | 50% |
| Threshold level of SOC for battery during reverse power accumulation ($SOC_{battR}$) | 50% |
| Threshold level of SOC for ultracapacitor during reverse power accumulation ($SOC_{ucR}$) | 90% |
| Steady load demand from battery | 750 W |
| Maximum instantaneous load demand from the ultracapacitor | 2 kW |
| Total mission time | 1.5 hrs |
| Controllable switches for reconfiguration | Two power MOSFETs connected (I = 300 A, V = 40 V) in back to back configuration. |

The prerequisite threshold levels of SOC to initiate forward power delivery during load demands are chosen for battery as 20% and for ultracapacitor as 50%. It is quite evident from the consideration of Table 2 that both the battery and the ultracapacitor are capable of recuperating the regenerative energy when their SOC are less than their respective SOC threshold levels of 50% and 90%. Furthermore, during a power delivery event, the ultracapacitor can be discharged only up to a terminal voltage of 8V which corresponds to 34% of the ultracapacitor's SOC beyond which the ultracapacitor will be incapable of delivering the load power owing to limitations of the dc/dc power converter.

A typical load profile of 95 seconds along with the power sharing of battery and ultracapacitor and their corresponding SOCs are illustrated in FIG. 1(a), FIG. 1(b) and FIG. 1(c) respectively. The load power profile (FIG. 1(a)) is maintained by the mini electric vehicle in subsequent repetitive cycles throughout the entire mission time of 1.5 hrs. The load profile is synonymous to the driving pattern of the mini electric vehicle and it depicts the various dynamic events of steady speed operation, acceleration and braking as encountered during the mission. The complete load profile of 95 seconds is segmented in to successive events starting from event 1 to event 10. Each of the events (1 to 10) of the load profile represents the dynamic scenarios of steady speed operation, acceleration or braking of the vehicle.

Initially, at the start of the mission both the battery and the ultracapacitor remain in fully charged condition with their terminal voltages being at 28.5V and 16.2V, respectively. The event 1 of the load profile depicts the steady speed operation of the vehicle for duration of 10 seconds when the load demands a continuous power of 750 W which is supplied through the first dc/dc power converter. Since the load demand is within the limit of the battery side dc/dc power converter (<1 kW), the battery is coupled to the input side of the first dc/dc power converter on activating the controllable switch Su to supply the load power for the 10 seconds duration. The ultracapacitor on the other hand remains in full charged condition being decoupled from the system during the event 1. In the next instant, during the event 2, the vehicle undergoes a sudden acceleration for 7 seconds on account of which an instantaneous load power of 2.2 kW is demanded, which is greater than the individual power ratings of both the dc/dc power converters but within the limit of their combined power ratings (<1 kW+2 kW). Under such scenarios, the ultracapacitor comes in to action to deliver the surplus amount of peak load power of 1450 W in addition to the battery supplying a continuous load power of 750 W. Therefore, the system is reconfigured coupling the ultracapacitor to the input side of the second dc/dc power converter by activating the controllable switch $S_{22}$ with the battery being already coupled to the input of the first dc/dc power converter from the previous operation scenario. Thus, the load power is shared by the battery supplying a steady power through the first dc/dc power converter while the ultracapacitor caters the remaining portion of the load demand through the second dc/dc power converter. At the end of the event 2 after 7 seconds, the ultracapacitor gets discharged up to 47.5% of its SOC with the ultracapacitor's terminal voltage dropped to 11.02V. The succeeding event 3 showcases the vehicle driving scenario of further acceleration for a prolonged duration of 15 seconds demanding an instantaneous load power of 1.6 kW which is greater than the rating of the first dc/dc power converter but within the limit of rating of second dc/dc power converter. In this scenario, since the ultracapacitor is unable to cater the load demand owing to its SOC already dropped below the threshold level $SOC_{ucF}$ from the previous operating mode, the battery is engaged to deliver the load power. Therefore the system is reconfigured such that the battery is decoupled from the first dc/dc power converter by deactivation of the switch Su and subsequently coupled to the input of the second dc/dc power converter on activating the controllable switch $S_{12}$ thereby enabling the battery to deliver the load power of 1.6 kW through the second dc/dc power converter for 15 seconds. In the next event 4 the vehicle undergoes a regenerative braking for 10 seconds developing a regenerative power of approximately 800 W. Since, the regenerative power is within the limit of the first dc/dc power converter and the battery SOC is higher than $SOC_{battR}$, the ultracapacitor is required to be engaged for recuperating the regenerative power owing to its SOC less than $SOC_{ucR}$. Thus, the system is reconfigured by deactivating the controllable switch $S_{12}$ to decouple the battery from the second dc/dc power converter and accordingly activating the controllable switch $S_{21}$ to couple the ultracapacitor with the first dc/dc power converter, thereby facilitating the reverse flow of regenerative power from the load to be accumulated in the ultracapacitor. After recuperating the regenerative energy for the duration of 10 seconds, the ultracapacitor gets recharged up to 83.4% of its SOC with its terminal voltage increased to 14.6V. The event 5 depicts a heavy acceleration scenario of the vehicle for duration of 10 seconds with the instantaneous power being demanded as 2.6 kW. At the beginning of this event, the battery supplies the continuous load demand of 750 W through first dc/dc power converter whereas the remaining 1850 W of the total load demand (2.6 kW) is delivered by the UC through the second dc/dc power converter. Thus, the operating stage starts off with the system being reconfigured such that the battery is coupled to the first dc/dc power converter by activating switch $S_{11}$ and the ultracapacitor is coupled to the second dc/dc power converter by activating switch $S_{22}$. After delivering the peak load power of 1850 W for 6 seconds the ultracapacitor's terminal voltage reaches to 8V (corresponding SOC of 34%), thereby ceasing its operation to deliver the load power for the remaining duration of the event. Now, in order to cater the load demand for the remaining 4 seconds, the battery is required to be engaged for delivering the total load power of 2.6 kW owing to which the system is further reconfigured such that the battery is coupled to both the first dc/dc power converter and the second dc/dc power converter by activating the controllable switches Su and $S_{12}$ respectively while the ultracapacitor is decoupled from the system. In the next event 6, the vehicle experiences another braking event for duration of 8 seconds. The ultracapacitor becomes the sole acceptor for recuperating the 1.6 kW of regenerative energy in this event owing to its reduced SOC in the previous event. Consequently, the system is reconfigured to couple the ultracapacitor with the second dc/dc power converter by activating the controllable switch $S_{22}$ thereby facilitating the reverse flow of regenerative power from the load to be recuperated in the ultracapacitor through the second dc/dc power converter. At the end of this event, the ultracapacitor is recharged up to 91% of its SOC with the terminal voltage increased to 15.2V which ensures its capability of delivering the instantaneous load demands for the upcoming acceleration event. In the event 7, the vehicle further experiences an acceleration for 5 seconds with a load power demand of 2.7 kW. Thus the system is again reconfigured as the battery coupled to the first dc/dc power converter by activating the controllable switch Su for delivering 750 W of the total demand and the UC coupled to the second dc/dc power converter by activating the controllable switch $S_{22}$ for delivering 1950 W of the total load demand. The ultracapacitor is discharged up to 45.2% of its SOC and terminal voltage of 9.9V after delivering the load demand for 5 seconds. In the next event 8, the vehicle further experiences a braking scenario for 5 seconds with a regenerative power of 2.3 kW, which is recuperated by the ultracapacitor through both the first dc/dc power converter and second dc/dc power converter configured in parallel by activating the controllable switches $S_{21}$ and $S_{22}$ to couple the ultracapacitor with the first and second dc/dc power converters respectively. At the end of event 8 the ultracapacitor gets recharged up to 98.9% of SOC with the terminal voltage increased to 15.9V. The next event 9 again depicts a steady speed operation of the vehicle for a duration of 16 seconds with a load power demand of 600 W being delivered by the battery through the first dc/dc power converter. This event implements the system reconfiguration method which is same as the reconfiguration method implemented during the event 1. The final event 10 of the load profile showcases another braking scenario of the vehicle for duration of 9 seconds with the regenerative power of 1.9 kW. Since, both the battery and ultracapacitor are incapable of accumulating the regenerative energy owing to their respective SOCs higher than $SOC_{battR}$ and $SOC_{ucR}$, the battery and ultracapacitor get decoupled from the dc/dc power converters thereby causing a loss of the regenerative power. This entire load profile is sequentially repeated throughout the total mission. At the end of one such load profile, the SOC of the battery falls to approximately 98.2%. Hence, it is estimated that after completion of 32 cycles (approximately 50 minutes from the start of the mission) the battery SOC will reduce up to 50% which implies that in the subsequent load cycles, the battery would be engaged in reverse power accumulation modes during the respective events 4, 8 and 10 of regenerative braking.

Example 2

The following example demonstrates a typical working scenario of the switched reconfigurable multi-converter multi-source energy storage system configuration comprising of fuel cell and a battery as the two energy storage systems, two bidirectional dc/dc power converters of equal power ratings and four numbers of controllable switches intended for a fuel cell-battery hybrid electric bus where all the wheels are powered by in-wheel electric hub motors. The different parametric specifications are tabulated in Table 3.

TABLE 3

| Parameters | Descriptions |
| --- | --- |
| Fuel Cell stack Specifications | 288 V, 75 kW |
| Battery (LiB) Specifications | 240 V, 60 kWh |
| DC traction bus voltage | 320 V |
| DC/DC power converter (Battery side & Fuel Cell side) type | Bidirectional Buck Boost |
| Input voltage range of both the dc/dc power converter | 180 V to 300 V |
| Output voltage range of both the dc/dc power converter | 290 V to 350 V |
| Power rating of individual dc/dc power converter | 75 kW |
| Power rating of each in-wheel electric hub motor | 25 kW |
| Combined motor power rating | 100 kW (25 kW*4) |
| Average motor power demand | 60 kW |
| Motor peak power demand during acceleration | 150 kW |

TABLE 3-continued

| Parameters | Descriptions |
| --- | --- |
| Controllable switches for reconfiguration | Two power MOSFETs (I = 500 A, V = 400 V) connected in back to back configuration. |

Under normal operating scenarios, the load demands of the fuel cell-battery powered hybrid electric bus are fulfilled by the combined response from fuel cell and the Li-ion battery, each of which supplies the load power through their respective dc/dc power converters. This example demonstrates the working of the switched reconfigurable multi-converter multi-source energy storage system configuration for similar rating dc/dc power converters when either of the two dc/dc power converters encounters a fault during operation. The average motor power demands of 60 kW and peak power demands of 150 kW are equally shared by both the fuel cell and the battery through their respective dc/dc power converters. During average power demands of 60 kW, each of the dc/dc power converter operates at 40% of their total rated capacity of 75 kW. Under such scenarios, the system is configured as the fuel cell being coupled to the first dc/dc power converter on activation of the controllable switch $S_{11}$ and the battery being coupled to the second dc/dc power converter on activation of the controllable switch $S_{22}$. After 30 minutes of operation, the first dc/dc power converter encounters a fault and the system gets reconfigured to decouple the first dc/dc power converter from the fuel cell by deactivating the controllable switch $S_{11}$. During such event the battery continues to deliver the required average motor power demand (60 kW) through the second dc/dc power converter operating at 80% of its rated capacity with the peak power delivering capability restricted to maximum 75 kW. Now, while supplying the power demand continuously through the second dc/dc power converter for a period of 30 minutes, the SOC of the battery falls to a threshold level (20%) beyond which the battery is unable to deliver any further demands pertaining to which the system is reconfigured by decoupling the battery from the second dc/dc power converter by deactivating the controllable switch $S_{22}$ and instead coupling the fuel cell to the second dc/dc power converter by activating the controllable switch $S_{12}$. The fuel cell continues to deliver the steady load demands through the second dc/dc power converter to ensure fail-safe operation of the system with peak load delivering capability restricted to maximum 75 kW for the rest of the driving period.

Advantages:
Advantages of the present invention include:
1. The switched reconfigurable structure of the multi-converter multi-source energy storage system provides effective utilization of the multiple dc/dc power converters and multiple energy sources while meeting the dynamic power requirements of an electrified vehicle.
2. It enhances the power delivering capability of the energy sources.
3. It helps in recuperating maximum amount of regenerative power into the energy sources.
4. The switching methods employed for the system ensures dynamic reconfiguration of the system depending upon the varying power level scenarios corresponding to steady speed operation, acceleration and regenerative braking of an electrified vehicle.

5. The system is equally adaptable irrespective of power ratings and nature of the energy sources and the dc/dc power converters.
6. The power flow control scheme based on instantaneous decision making process with the associated dynamic switching methods ensures flexibility of the switched reconfigurable energy storage system.
7. The fault tolerant control scheme with the associated switching methods ensures fail-safe operation of the switched reconfigurable energy storage system.

What is claimed is:

1. A Switched Reconfigurable Multi-Converter Multi-Source Energy Storage System Configuration for Electrified Vehicles comprising: a first energy source, a second energy source, a first dc/dc power converter, a second dc/dc power converter of equal or unequal power rating with respect to first dc/dc power converter, a mode selector switching module further comprising of plurality of controllable switches and a controller wherein; the first energy source one of coupled to or decoupled from the input of the first dc/dc power converter by activating or deactivating the first controllable switch of the mode selector switching module; the first energy source is one of coupled to or decoupled from the input of the second dc/dc power converter by activating or deactivating the second controllable switch of the mode selector switching module; the second energy source is one of coupled to or decoupled from the input of the first dc/dc power converter by activating or deactivating the third controllable switch of the mode selector switching module; the second energy source is one of coupled to or decoupled from the input of the second dc/dc power converter by activating or deactivating the fourth controllable switch of the mode selector switching module; the output side of both the first dc/dc power converter and second dc/dc power converter is directly coupled to a common dc-link supplying a load corresponding to the motor drivetrain of the electrified vehicle; the controller executes a power flow control scheme to implement a switching by activating or deactivating at least one of four controllable switches of the mode selector switching module for reconfiguring the system in forward power delivery mode to deliver the power from energy source to the load or reverse power accumulation mode to accumulate the regenerative power from load to the energy source.

2. The Switched Reconfigurable Multi-Converter Multi-Source Energy Storage System Configuration for Electrified Vehicles of claim 1 further comprising of forward power delivery mode 1 wherein, either the first energy source is coupled to the input of first dc/dc power converter by activating the first controllable switch or the second energy source is coupled to the input of the first dc/dc power converter by activating the third controllable switch with the second dc/dc power converter being decoupled from both the first energy source and the second energy source by deactivating the second controllable switch and fourth controllable switch, respectively.

3. The Switched Reconfigurable Multi-Converter Multi-Source Energy Storage System Configuration for Electrified Vehicles of claim 2, wherein the power flow control scheme for activation or deactivation of the controllable switches during forward power delivery mode 1, when the load power demand is within the limit of power rating of the first dc/dc power converter and either of the first energy source or the second energy source is capable to deliver the required load demand, the multi-converter multi-source energy storage system is reconfigured to enable the forward flow of power from either of the energy sources to the load through the first dc/dc power converter.

4. The Switched Reconfigurable Multi-Converter Multi-Source Energy Storage System Configuration for Electrified Vehicles of claim 1 further comprising of forward power delivery mode 2 wherein, either the first energy source is coupled to the input of second dc/dc power converter by activating the second controllable switch or the second energy source is coupled to the input of the second dc/dc power converter by activating the fourth controllable switch with the first dc/dc power converter being decoupled from both the first energy source and second energy source by deactivating the first controllable switch and third controllable switch, respectively.

5. The Switched Reconfigurable Multi-Converter Multi-Source Energy Storage System Configuration for Electrified Vehicles of claim 4 wherein; the four controllable switches of the multi-converter multi-source energy storage system are bidirectional switches and the two dc/dc power converters are bidirectional power converters to facilitate the reverse flow of regenerative power from the load to the energy source during reverse power accumulation mode 2 in order to accumulate the regenerative energy in either of the two energy sources through the second dc/dc power converter.

6. The Switched Reconfigurable Multi-Converter Multi-Source Energy Storage System Configuration for Electrified Vehicles of claim 5, wherein a power flow control scheme for activation or deactivation of the controllable switches during reverse power accumulation mode 2, when the regenerative load power is within the limit of power rating of the second dc/dc power converter and either of the first energy source or the second energy source is capable to accumulate the regenerative power, the multi converter multi source energy storage system is reconfigured to enable the reverse flow of regenerative power from the load to be accumulated in either of the energy sources through the second dc/dc power converter.

7. The Switched Reconfigurable Multi-Converter Multi-Source Energy Storage System Configuration for Electrified Vehicles of claim 4, wherein the power flow control scheme for activation or deactivation of the controllable switches during forward power delivery mode 2, when the load power demand is within the limit of power rating of the second dc/dc power converter and either of the first energy source or the second energy source is capable to deliver the required load demand, the multi-converter multi-source energy storage system is reconfigured to enable the forward flow of power from either of the energy sources to the load through the second dc/dc power converter.

8. The Switched Reconfigurable Multi-Converter Multi-Source Energy Storage System Configuration for Electrified Vehicles of claim 1 further comprising of forward power delivery mode 3 wherein; the first energy source is coupled to the input side of both the first dc/dc power converter and the second dc/dc power converter by activating the first controllable switch and the second controllable switch respectively with the second energy source being completely decoupled from the system; or, the second energy source is coupled to the input side of both the first dc/dc power converter and the second dc/dc power converter by activating the third controllable switch and the fourth controllable switch respectively with the first energy source being completely decoupled from the system; or, the first energy source is coupled to the input side of the first dc/dc power converter by activating the first controllable switch and the second energy source is coupled to the input side of the second dc/dc power converter by activating the fourth controllable switch.

9. The Switched Reconfigurable Multi-Converter Multi-Source Energy Storage System Configuration for Electrified Vehicles of claim 8 wherein; the four controllable switches of the multi-converter multi-source energy storage system are bidirectional switches and the two dc/dc power converters are bidirectional power converters to facilitate the reverse flow of regenerative power from the load to the energy source during reverse power accumulation mode 3 in order to accumulate the regenerative energy in the first energy source through both the first dc/dc power converter and second dc/dc power converter coupled together in parallel configuration with the first energy source; or, in the second energy source through both the first dc/dc power converter and second dc/dc power converter coupled together in parallel configuration with the second energy source; or, in the first energy source through the first dc/dc power converter and the second energy source through the second dc/dc power converter.

10. The Switched Reconfigurable Multi-Converter Multi-Source Energy Storage System Configuration for Electrified Vehicles of claim 9, wherein a power flow control scheme for activation or deactivation of the controllable switches during reverse power accumulation mode 3, when the regenerative load power is greater than the individual power ratings of both the dc/dc power converters, and within or beyond the limit of combined power ratings of both the first dc/dc power converter and second dc/dc power converter, while only the first energy source is capable to accumulate the regenerative power, the multi-converter multi-source energy storage system is reconfigured to maneuver the reverse flow of regenerative power from the load to be accumulated in first energy source through both the dc/dc power converters coupled together in parallel configuration without any portion of regenerative power being accumulated in the second energy source; or, while only the second energy source is capable to accumulate the regenerative power, the multi-converter multi-source energy storage system is reconfigured to maneuver the reverse flow of regenerative power entirely from the load to be accumulated in second energy source through both the dc/dc power converters coupled together in parallel configuration without any portion of power being accumulated in the first energy source; or, while both the first energy source and the second energy source are capable to accumulate the regenerative power, the multi-converter multi-source energy storage system is reconfigured to maneuver the reverse flow of regenerative power from the load to be accumulated in both the first energy source and the second energy source through the first dc/dc power converter and second dc/dc power converter, respectively.

11. The Switched Reconfigurable Multi-Converter Multi-Source Energy Storage System Configuration for Electrified Vehicles of claim 8, wherein a power flow control scheme for activation or deactivation of the controllable switches during forward power delivery mode 3, when the load power demand is greater than the individual power ratings of both the dc/dc power converters, and within or beyond the limit of combined power ratings of both the first dc/dc power converter and second dc/dc power converter, while only the first energy source is capable to deliver the required load demand, the multi-converter multi-source energy storage system is reconfigured to maneuver the forward flow of power entirely from the first energy source to the load through both the dc/dc power converters coupled together in parallel configuration without any portion of power being delivered from the second energy source; or, while only the second energy source is capable to deliver the required load demand, the multi-converter multi-source energy storage system is reconfigured to maneuver the forward flow of power entirely from the second energy source to the load through both the dc/dc power converters coupled together in parallel configuration without any portion of power being delivered from the first energy source; or, while both the first energy source and the second energy source are capable to deliver the required load demand, the multi-converter multi-source energy storage system is reconfigured to maneuver the forward flow of power from both the first energy source and the second energy source to the load through the first dc/dc power converter and second dc/dc power converter respectively.

12. The Switched Reconfigurable Multi-Converter Multi-Source Energy Storage System Configuration for Electrified Vehicles of claim 1, wherein the four controllable switches of the mode selector switching module are bidirectional switches and the two dc/dc power converters are bidirectional power converters to facilitate the reverse flow of regenerative power from the load to the energy sources during reverse power accumulation mode 1 in order to accumulate the regenerative energy in either of the two energy sources through the first dc/dc power converter.

13. The Switched Reconfigurable Multi-Converter Multi-Source Energy Storage System Configuration for Electrified Vehicles of claim 12, wherein a power flow control scheme for activation or deactivation of the controllable switches during reverse power accumulation mode 1, when the regenerative load power is within the limit of power rating of the first dc/dc power converter and either of the first energy source or the second energy source is capable to accumulate the regenerative power, the multi-converter multi-source energy storage system is reconfigured to enable the reverse flow of regenerative power from the load to be accumulated in either of the energy sources through the first dc/dc power converter.

14. The Switched Reconfigurable Multi-Converter Multi-Source Energy Storage System Configuration for Electrified Vehicles of claim 1 wherein; when either of the two dc/dc power converters encounters a fault during the operation, the energy source is decoupled from the faulty dc/dc power converter by deactivating the respective controllable switch and the energy source is coupled to the non-faulty dc/dc power converter by activating the respective controllable switch if and only if the non-faulty dc/dc power converter is not coupled to the other energy source, thereby ensuring a fail-safe operation of the system.

15. The Switched Reconfigurable Multi-Converter Multi-Source Energy Storage System Configuration for Electrified Vehicles of claim 1, wherein both the energy sources are selected from combinations of dissimilar type among battery, fuel cell and ultracapacitor.

* * * * *